United States Patent
Glanzner

(10) Patent No.: US 10,550,910 B2
(45) Date of Patent: Feb. 4, 2020

(54) MAGNETIC DAMPER FOR VIBRATION ABSORBERS

(71) Applicant: ESM ENERGIE—UND SCHWINGUNGSTECHNIK MITSCH GMBH, Heppenheim (DE)

(72) Inventor: Sebastian Glanzner, Lorsch (DE)

(73) Assignee: ESM ENERGIE—UND SCHWINGUNGSTECHNIK MITSCH GMBH, Heppenheim (DE)

(*) Notice: Subject to any disclaimer, the term of this patent is extended or adjusted under 35 U.S.C. 154(b) by 10 days.

(21) Appl. No.: 15/502,844

(22) PCT Filed: Aug. 7, 2015

(86) PCT No.: PCT/EP2015/001637
§ 371 (c)(1),
(2) Date: Feb. 9, 2017

(87) PCT Pub. No.: WO2016/023628
PCT Pub. Date: Feb. 18, 2016

(65) Prior Publication Data
US 2017/0219045 A1 Aug. 3, 2017

(30) Foreign Application Priority Data

Aug. 13, 2014 (EP) .................................... 14002824
Dec. 16, 2014 (EP) .................................... 14004235

(51) Int. Cl.
*F16F 15/03* (2006.01)
*F03D 80/00* (2016.01)

(52) U.S. Cl.
CPC ............ *F16F 15/035* (2013.01); *F03D 80/00* (2016.05); *F16F 2222/06* (2013.01)

(58) Field of Classification Search
CPC ............. F16F 6/00; F16F 6/005; F16F 15/035
See application file for complete search history.

(56) References Cited

U.S. PATENT DOCUMENTS

| 4,128,147 A | * | 12/1978 | Lafuente Ruberte | ..... B60T 1/06 |
| | | | | 188/164 |
| 4,624,435 A | * | 11/1986 | Freudenberg | ........... F16F 15/03 |
| | | | | 180/300 |

(Continued)

FOREIGN PATENT DOCUMENTS

| DE | 37 41 578 A1 | 6/1988 |
| EP | 2 696 072 A1 | 2/2014 |

(Continued)

OTHER PUBLICATIONS

Machine translation of EP 2696072, retrieved Aug. 2, 2018 (Year: 2018).*

(Continued)

*Primary Examiner* — Bradley T King
(74) *Attorney, Agent, or Firm* — Davis & Bujold PLLC; Michael J. Bujold

(57) ABSTRACT

Rotationally symmetric dampers (FIG. 3A) of a new type for eliminating and avoiding vibrations in machines and installations, particularly wind turbines. The damping occurs by magnetically generated eddy currents. In addition, vibration absorbers, particularly pendulum absorbers (7), are equipped with such magnetic dampers, and to installations, particularly wind turbines, that are exposed to vibratory forces and that comprise such vibration absorbers.

10 Claims, 14 Drawing Sheets

(56) References Cited

U.S. PATENT DOCUMENTS

| | | | | |
|---|---|---|---|---|
| 4,668,886 | A * | 5/1987 | Marandet | B60L 7/003 310/93 |
| 4,724,923 | A * | 2/1988 | Waterman | F16F 15/03 181/208 |
| 5,392,881 | A * | 2/1995 | Cho | F16F 15/035 188/267 |
| 5,749,444 | A * | 5/1998 | Skalski | B66B 7/044 187/292 |
| 6,471,018 | B1 * | 10/2002 | Gordaninejad | F16F 9/535 188/267.1 |
| 8,055,408 | B2 * | 11/2011 | Gopalakrishnan | B60G 17/06 188/267 |
| 2005/0016802 | A1 * | 1/2005 | Akami | F16F 9/3207 188/267 |
| 2005/0072638 | A1 * | 4/2005 | Kim | F16F 15/03 188/267.2 |
| 2007/0131504 | A1 | 6/2007 | Bronowicki et al. | |
| 2011/0127128 | A1 * | 6/2011 | Fasick | F16F 15/035 188/267 |
| 2012/0193179 | A1 * | 8/2012 | Gysen | B60G 11/00 188/267 |
| 2013/0216351 | A1 * | 8/2013 | Griffin | F01D 25/06 415/1 |
| 2017/0045107 | A1 * | 2/2017 | Chen | F16F 6/005 |

FOREIGN PATENT DOCUMENTS

| | | | | |
|---|---|---|---|---|
| EP | 2696072 A1 * | 2/2014 | | F03D 80/00 |
| FR | 2 995 561 A1 | 3/2014 | | |
| WO | 2012/015488 A1 | 2/2012 | | |

OTHER PUBLICATIONS

Written Opinion Corresponding to PCT/EEP2015/001637 dated Nov. 23, 2015.

International Search Report Corresponding to PCT/EP2015/001637 dated Nov. 23, 2015.

* cited by examiner (A)

(B)

(A)

(B)

(C)

(A)

(B)

(A)

(B)

(A)

(B)

MAGNETIC DAMPER FOR VIBRATION ABSORBERS

SUBJECT-MATTER AND TECHNICAL FIELD OF THE INVENTION

The invention relates to novel rotationally symmetrical dampers for eliminating and avoiding vibrations in machines and installations, in particular wind turbines, where the damping takes place by means of magnetically generated eddy currents. In particular, the invention relates to eddy-current dampers which are arranged in a rotationally symmetrical manner with respect to a longitudinal axis and consist of one or more stacked ring magnets or magnetic ring-shaped arrangements of correspondingly aligned permanent magnets and/or electromagnets which are arranged in their totality in a ring shape around said longitudinal axis.

The invention furthermore relates to vibration absorbers, in particular pendulum absorbers, which are fitted with magnetic dampers of this type, and to installations, in particular wind turbines, which are subjected to vibrational forces and have vibration absorbers of this type.

Magnetic or eddy-current dampers are known as such from the prior art. The mode of functioning of such dampers is based on the fact that a current is induced in an electrical conductor which is moving due to a changing magnetic field. This induced current, also called eddy current, likewise generates a magnetic field. The magnetic field acts against the first magnetic field and thus generates a resistance force. Due to axial relative movement between conductor and magnetic field, a rotating eddy current is induced in the conductor. These resultant eddy currents in turn form magnetic fields which acts against the original magnetic field and brakes the movement of the conductor. If the speed increases, the eddy current in the conductor increases, which results in a stronger magnetic field, causing the movement to be braked further and more strongly.

DE 37 41 578 A1 describes a vibration-damping device for precision machines which is based on movement of a plate between the north and south poles of a magnetic field. US 2007/0131504 describes a planar vibration damper in which a transversal pendulum device is moved in the field of magnetic fields arranged in a planar manner. EP 2 696 072 describes a vibration damper arrangement for wind turbines having a weight pendulum. In the case of vibration, the weight pendulum here is preferably moved in two vibration directions, resulting in movement through a magnetic field arranged in a planar manner, which generates the damping eddy current.

The magnetic dampers described in the prior art have the disadvantage that they are very direction-dependent and cannot be rotated axially. In addition, sufficiently high damping densities of frequently greater than 1000 kNs/m×m$^3$ often cannot be achieved with them, although they are vital on use of wind turbines, in particular of wind turbines having towers with a height of 100 m or more.

The object was thus to provide a magnetic damper, in particular for use in wind turbines, which no longer has the disadvantages described. The object is achieved by provision of the magnetic damper specified below and in claims and of vibration dampers which have a magnetic damper of this type.

SUMMARY OF THE INVENTION

It has now been found that a vibration damper which essentially consists of a tube made from a conductive, but non-magnetisable material which is moved by rings of magnetisable materials, in particular permanent magnets and/or electrical coils generating magnetic fields, arranged around the tube, is generates an eddy current, which in turn induces a magnetic field which acts against the original magnetic field and thus effects braking of the movement of the tube or damping of the movement. If a tube of this type is connected, for example, to a vibration device, in particular a pendulum, the vibration or pendulum movement can be effectively damped.

The eddy-current dampers of the prior art only achieve damping densities of max. 1000 kNs/(m×m$^3$). By means of the damper according to the invention that is presented here, it is possible to achieve damping densities (damping (attenuation) constant per volume) between 500 and 3000-5000 kNs/(m×m$^3$), but in general of significantly greater than 1000 kNs/(m×m$^3$), preferably ≥1500 kNs/(m×m$^3$), in particular ≥500 kNs/(m×m$^3$), corresponding to the type and number of magnetic components employed. This is a considerable improvement over the prior art.

Such magnetic dampers according to the invention are thus highly suitable, in particular, for pendulum absorbers in medium-sized and large wind turbines, but also in other vibration-susceptible tall buildings and installations, in order to reduce or avoid all types of interfering vibrations which occur in such installations.

Some terms are used below and in the claims and will hereby be explained briefly.

The term "ring" or "magnet ring" is defined as encompassing all conceivable ring-shaped or approximately ring-shaped structures, i.e. all arrangements which have a defined equal or approximately equal separation with respect to an imaginary centre point, where equilateral polygons having at least six sides are also included.

Furthermore, a distinction is made between outer and inner rings, magnet rings, or ring arrangements. Outer rings are in accordance with the invention magnetic ring arrangements which are run externally around the tube (3) in relation to the conductor or damper tube (3) without being in contact with the outside wall in a certain region while maintaining a certain, approximately equal separation. Inner rings are in accordance with the invention magnetic ring arrangements which are run internally around the tube (3), i.e. along the internal resistance, in relation to the conductor or damper tube (3) without being in contact with the internal resistance in a certain region while maintaining a certain, approximately equal separation.

Furthermore, a distinction is made between radially magnetised or magnetisable rings and axially magnetised or magnetisable rings. "Radially" and "axially" here relate to the longitudinal axis of the damper tube (3) or of the entire magnetic damper according to the invention. "Magnetised rings" here means that the north/south alignment of the magnets employed are arranged either axially or radially to said longitudinal axis. A combination of axially and radially aligned magnets with a certain sequence of the magnetisation direction are also called "Halbach arrangement".

Furthermore, a distinction is made between rings or ring arrangements comprising "permanent magnets" and "electromagnets", Permanent magnets are intrinsically permanently magnetic materials which are formed in full or part in a ring shape, or rectangular flat or cube magnets which are arranged alongside one another in a circle shape. Electromagnets are defined as coils or coil bodies in the form of coil rings, where the coils or coil rings only generate a magnetic field when a current flows. Unless stated otherwise, a coil ring consists of a coil winding running in a ring shape around the diameter of the tube (3).

In detail, the following terms are used:
outer radially magnetised permanent magnets (1)
inner radially magnetised permanent magnets (4)
outer radially magnetised electromagnets in the form of wound coils (6)
inner radially magnetised electromagnets in the form of wound coils (16)
outer axially magnetised permanent magnets 11)
inner axially magnetised permanent magnets (12)
Halbach arrangement: an arrangement of adjacent permanent magnets of type (1)(11) or (4)(12) in which the magnetisation direction changes from magnet to adjacent magnet by in each case 90° in one direction.

The invention thus relates to a rotationally symmetrical magnetic damper comprising
(i) a damper tube (3) made from a non-magnetisable conductive material, preferably aluminium, copper or alloys of these metals,
(ii) a support device (10), which is rotationally symmetrical around the longitudinal axis of the damper, is provided with attachment means and has at least one, preferably two to ten, magnetic outer rings or correspondingly ring-shaped arrangements of one or more permanent magnets (1) or coils (6) functioning as electromagnets, which are arranged or magnetised in such a way that north and south poles of the magnet(s) point either radially inwards or radially outwards in relation to the longitudinal axis of the tube (3) of the magnetic damper, where the said magnetic outer rings (1)(6) have been pushed over the damper tube (3), and ring(s) and tube are movable relative to one another, and the separation between the at least one magnetic ring (1)(6) and the outside surface of the damper tube (3) is ≥0.1 mm and ≤2.0 mm, preferably 0.25-1.5 mm, in particular 0.5-1.0 mm, where, on use of two or more rings (1)(6), or ring-shaped arrangements, these are arranged, or magnetised, in such a way that the radially directed polarity of a magnet ring (1)(6) of one plane is opposite to the radially directed polarity of the magnet ring (1)(6) arranged immediately above and/or below, i.e. the radially magnetised ring planes alternate in their polarity, and
(iii) optionally or preferably at least one ring (2) consisting of a ferromagnetic material or a corresponding ring-shaped arrangement, for example made from steel, preferably steel having a relatively high iron content, or comprising segments composed thereof, where this ring (2) immediately surrounds the at least one magnetic outer ring (1)(6) and the number of rings (2) corresponds to the number of rings (1)(6).

In a specific, particularly advantageous embodiment, the magnetic damper according to the invention includes a damping tube (3), in the interior of which is located a further tube or a bar (15) which consists of a ferromagnetic, i.e. magnetisable material, which is able to increase the magnetisation and thus the damping by at least three-fold. In particular in the case of a low space requirement, this embodiment can replace the further embodiment described below, which has at least one magnet ring (4) in the interior of the non-magnetisable, but conductive damping tube (3). The said inner tube (15) consists of a ferromagnetic material, such as, for example, iron or steel having a high iron content. The inner tube (15) (or bar) is simply pushed into the electrically conductive tube (3), and can optionally be firmly connected thereto (for example by adhesive bonding), if this should be necessary. Otherwise, it can be pushed in and out in a variable manner. No relative movement takes place between the two tubes (3) and (15). Thus, either a damper having higher performance or a smaller damper having the same performance can be achieved. At the same time, the number of magnets required is minimised. FIG. 14 shows an inner tube of this type.

The invention thus relates to a corresponding magnetic damper which has a damper tube (3) and additionally a tube consisting of a ferromagnetic material or a corresponding round bar (15), which is in contact with the inside wall of the damper tube (3) and is connected thereto in such a way that it also executes the relative movement of the damper tube (3).

The invention furthermore relates to a rotationally symmetrical magnetic damper comprising
(i) a damper tube (3) made from a non-magnetisable conductive material, preferably aluminium, copper or alloys of these metals,
(ii) a support device (10), which is rotationally symmetrical around the longitudinal axis of the damper, is provided with attachment means and which has at least one, preferably two to ten, magnetic inner rings or correspondingly ring-shaped arrangements of one or more permanent magnets (4) or coils (16) functioning as electromagnets, which is or are arranged or magnetised in such a way that north and south poles of the magnet(s) point either radially inwards or radially outwards in relation to the longitudinal axis or of the tube (3) of the magnetic damper or, where the magnetic inner ring(s) (4)(16) have been pushed into the damper tube (3), and ring(s) and tube are movable relative to one another, and the separation between the at least one magnetic ring (4)(16) and the inside surface of the damper tube (3) is ≥0.1 mm and ≤2.0 mm, preferably 0.25-1.25 mm, in particular 0.5-1.0 mm, where, on use of two or more rings (4)(16), these are arranged, or magnetised, in such a way that the radially directed polarity of a magnet ring (4)(16) of one plane is opposite to the radially directed polarity of the magnet ring (4)(16) arranged immediately above and/or below, i.e. the radially magnetised ring planes alternate in their polarity, and
(iii) optionally or preferably at least one solid cylindrical core (5) or parts composed thereof, consisting of a ferromagnetic material, for example steel, preferably steel having a relatively high iron content, which is immediately surrounded by the at least one magnetic inner ring (4)(16), where the number of cores (5) corresponds to the number of the rings (4)(16).

In a particular embodiment of the invention, a magnetic damper is provided which combines the features of the two magnetic damper is described above, i.e. has in relation to the conductive non-magnetisable tube (3) both outer and inner magnets and/or coils functioning as electromagnets.

The invention thus relates to a corresponding magnetic damper which, in addition to the said at least one magnetic outer ring (1)(6) (preferably two to ten rings or ring-shaped arrangements), has in the interior of the tube (3) at least one magnetic inner ring, preferably two to ten rings or ring-shaped arrangements, comprising in each case one or more permanent magnets (4) or coils (16) functioning as electromagnets, which are arranged or magnetised in such a way that north and south poles of the magnets) point either radially inwards or radially outwards in relation to the longitudinal axis or of the tube (3) of the magnetic damper, where arrangement and polarity of the magnetic inner ring (s) (4)(16) is selected in such a way that it is or they are positioned on the same plane opposite the at least one magnetic outer ring (1)(6) and the opposite poles of the inner and outer ring, or of the inner and outer rings, attract one another through the wall of the tube (3), and said rings (1)(6) and (4)(16) are movable together and relative to the damper tube (3), where the separation between the magnetic rings (1)(4) or (6)(16) and the outside surface or inside surface of the damper tube (3) is ≥0.1 mm and ≥2.0 mm, preferably 0.25-1.25 mm, in particular 0.5-1.0 mm, and where, in the case of the use of two or more rings, these are arranged, or magnetised, in such a way that the radially directed polarity of the magnet rings of one plane is opposite to the radially directed polarity of the magnet rings arranged immediately above and/or below, i.e. the radially magnetised ring planes, preferably consisting of an identical number of opposite, attracting rings, alternate in their polarity.

This embodiment may furthermore additionally have (i) at least one solid cylindrical core (5), or parts composed thereof, consisting of ferromagnetic material, which is immediately surrounded by the at least one magnetic inner ring (4), and/or (ii) at least one ring (2) consisting of ferromagnetic material or a corresponding ring-shaped arrangement.

In a further embodiment of the invention, the magnetic dampers according to the invention, besides outer and/or inner radially magnetised ring planes (1) (4), also additionally contain outer and/or inner axially magnetised ring planes with magnetic rings (11) and/or (12), which are arranged between the radially magnetised ring planes (1)(4) or (6) (16), to be precise in such a way that two adjacent axially magnetised ring planes attract one another through the corresponding polarity. This strengthens the magnetic fields of the radially arranged magnetic rings.

The invention thus relates to a corresponding rotationally symmetrical magnetic damper which, in addition to said radially magnetised magnets (1)(4), has at least one magnetic outer ring comprising one or more permanent magnets (11), which are arranged or magnetised externally around the damping tube (3) in such a way that north and south poles of the magnet(s) point axially upwards or downwards in relation to the longitudinal axis of the magnetic damper, where the magnetic damper according to the invention preferably has at least two axially magnetised outer rings (11) comprising permanent magnets, which are separated from one another by a radially magnetised outer ring (1)(6), where the axially directed polarity of these magnet rings alternates from axially magnetised ring plane to axially magnetised ring plane.

In a preferred embodiment of the invention, the magnetic damper according to the invention additionally has at least one magnetic inner ring comprising one or more permanent magnets (12), which are arranged and magnetised in the interior of the damper tube (3) in such a way that north and south poles of the magnet(s) point axially upwards or downwards in relation to the longitudinal axis of the magnetic damper, where the magnetic damper preferably has at least two axially magnetised inner rings (12), which are separated from one another by a radially magnetised inner ring (4), where the axially directed polarity of these magnet rings alternates from axially magnetised ring plane to axially magnetised ring.

The number of magnetic rings (1) preferably correspond to the number of rings (2) made from ferromagnetic material, preferably steel. In these cases, the rings (1) and (2) have the same thickness (in the axial direction and also in the radial direction), preferably from 10 to 60 mm. On use of magnet rings, or ring-shaped arrangements of bar or cube magnets, those having a thickness between 30 and 50 mm are the most efficient. However, it is also possible to use the rings (1) without corresponding outer rings (2), if it is not necessary to achieve such high damping densities. It is generally also possible to push a single wide outer ring (2) over a plurality of magnetic rings (1) as sleeve and to firmly connect it thereto, for example by adhesive bonding.

In embodiments with radially magnetised outer rings (1)(6) and radially magnetised inner rings (4)(16) of opposite polarity opposite them, it is preferred to employ the same number of outer and inner rings. However, it is also conceivable to use more outer or more inner rings in the magnetic damper according to the invention, where 1-5 ring planes have proven highly successful. There may also be circumstances which make it necessary to provide only embodiments which have only outer rings (1)(6) or only inner rings (4)(16).

In a preferred embodiment, the magnetic damper according to the invention has exclusively one or more outer and/or inner permanent magnets, where the permanent magnets have been magnetised radially inwards or radially outwards and, in the case of the presence of a plurality of ring planes stacked one above the other, these have alternating north/south magnetisation direction. This is a purely passive magnetic damper.

In a further preferred embodiment, the magnetic damper according to the invention has exclusively one or more outer and/or inner electromagnet in the form of coil rings, where the coils have been radially magnetised throughout and, in the case of the presence of a plurality of ring planes stacked one above the other, these have alternating north/south magnetisation direction. Since the coils can be operated actively with current which is variable in strength and phase, this is an active magnetic damper.

In another preferred embodiment, the magnetic damper according to the invention has an arrangement of two or more adjacent magnetic outer and/or inner ring planes comprising exclusively permanent magnets, where one ring plane, relative to the damper or conductor tube, always consists of radially magnetised magnets and the adjacent other ring plane consists of axially magnetised magnets, and furthermore, in the case of the presence of three or more, in particular four to five ring planes, two radially magnetised ring planes of the same type are separated by an axially magnetised ring plane and two axially magnetised ring planes of the same type are separated by a radially magnetised ring plane, and the north/south magnetisation direction of one ring plane is opposite to the north/south magnetisation direction of the next ring plane the same type. In this embodiment, the magnets are in a Halbach arrangement.

In a further preferred embodiment of the invention, the magnetic damper has rings comprising radially inwardly or outwardly magnetised permanent magnets, but also one or [lacuna] coil rings functioning as electromagnets, which can be operated with direct current of corresponding polarity or alternating current of variable and different frequency and/or phase shift. This makes it possible to obtain semi-active and active magnetic dampers according to the invention having variable controllable damping.

The permanent magnets employed for the magnetic dampers according to the invention may be continuous compact ring magnets or, since these are often difficult to produce, magnetic ring segments or individual bar magnets arranged correspondingly in combination in a ring shape, or individual magnets having a different shape, which are lined up correspondingly with identical polarity.

In the case of embodiments with radially magnetised inner rings (with or without outer rings) which slide along the cylindrical inside surface of the damping tube in the case of movement, these may additionally have an inner sleeve or a solid core (5) made from steel or corresponding ferromagnetic alloys, where this sleeve or core is preferably firmly connected, for example by adhesive bonding, to the inner ring or inner rings. The core or sleeve here may have the same axial size as the inner ring in question, but may also cover a plurality of rings.

The magnetic and ferromagnetic rings according to the invention or ring segments thereof usually have a radial and axial thickness between 10 and 60 mm, depending on the installation to be damped and the damping force required. The ferromagnetic ring (2) here can have a greater radial thickness than the outer radially magnetised magnetic ring (1), depending on the desired strengthening function of the ferromagnetic material.

In the magnetic dampers according to the invention, the support device (10) has retaining, locking and attachment means and optionally spacers and power connections, where these means are geometrically and functionally designed in such a way that the magnetic rings and coils can be accommodated individually or multiply in a rotationally symmetrical manner with an accurate fit in accordance with their diameter, guided, stacked, fixed and put into operation, and the corresponding damping tube (3) can be accommodated with an accurate fit.

In a further particular embodiment of the invention, it is possible to provide a magnetic damper having variably adjustable damping in which said support device (10) is designed in such a way that, depending on the desired damping, a different number of rotationally symmetrical magnetic outer and/or inner rings comprising permanent magnet arrangements and/or electromagnetic coils can be inserted into the carrier device and exchanged, where the inside and/or outside diameters of the magnetic rings are matched to the desired outside and/or inside diameters of the damper tube (3). The magnetic damper according to the invention can thus be supplied as a type of modular system, from which the user is able to assemble the individual damping himself, in accordance with the desired damping and the installation or machine present that is to be damped, in a simple and variable manner through the selection of the requisite components.

In those embodiments according to the invention in which no inner magnetic rings (permanent magnets or coils) and no ferromagnetic bars or sleeves (15) are required (in the case of relatively low magnetic field strengths), the conductive, non-magnetisable damper tube (3) may also be in the form of a bar or rod.

The magnetic dampers according to the invention are extremely suitable for use in vibration absorbers, in particular vibration absorbers based on a weight pendulum (pendulum absorbers).

The invention thus relates to a vibration absorber, in particular pendulum absorber (7), comprising at least one pendulum cable or pendulum rod with a pendulum weight and at least one rotationally symmetrical magnetic damper, as described above and below, where the magnetic damper is preferably attached to the pendulum rod or to the pendulum weight. In general, it is advantageous to employ two pendulum absorbers according to the invention, which are arranged in such a way that they cover the horizontal vibration plane.

The support device (10) of the magnetic damper can be attached to the pendulum weight or pendulum rod here, for example using ball joints or hinges, while the damping tube (3) or the damping rod is attached directly to the machine or installation to be damped, for example likewise using hinges or ball joints. Conversely, the damping tube (3) or the damping rod can be attached to the pendulum weight or pendulum rod, while the support device (10) of the magnetic damper is attached directly to the machine or installation to be damped.

It should be mentioned again that it is possible for the damping to be modified via the swing distance by adjustment of the wall thickness of the tube (3) (preferably between 5 and 15 mmm, in particular between 8 and 12 mm). Thus, it is possible to achieve a progressive and/or degressive characteristic line. This is very interesting, for example, if the absorber (7) is to have optimum damping in the middle swing region in order to reduce the resonances of the tower of a wind turbine or of another construction. Thus, in the extreme case with large swing distances of the absorber, these can be braked to a greater extent. Furthermore, it is possible to assemble the tube (3) from various materials, enabling the damping to be modified by modification of the specific electrical resistance.

A combination of permanent magnets with electromagnets and vibration monitoring can also help to limit the max. swing distances of the absorber (7) in the extreme case. In normal operation, the electromagnets would not be switched on and the damping would be matched optimally to the tower. As soon as the vibration of the absorber (7) becomes too great due to extreme loads, the electromagnets can be switched on in order to increase the damping and thus to brake the absorber (7)

In practice, it is necessary, in the case of a pendulum excursion, for the damper tube (3) to be passed through the rotationally symmetrical magnet system (comprising permanent magnets or electromagnetic coils which are arranged around the damping tube in a ring shape) in a non-contact and thus friction-free manner, in order that the requisite small separation between the two components can be maintained. In order to prevent the damping tube (3) from colliding with the outer and/or inner ring magnets, centring or spacing, which should be designed to be as low in friction as possible, is provided in a further embodiment of the invention.

The vibration damper according to the invention thus generally and preferably has a guide and/or spacer device or centring device (13) (14) which is positioned in front of and/or behind the region in which the eddy current is generated by the relative movement relative to one another. The requisite separation in this functionally effective region can thus be maintained between about 0.1 mm and 2.0 mm in a friction-free manner. The spacer or centring device used can be, for example, a ball bearing, a slide bushing, a roller bearing (13) or a roller device (14), which, at the same time as maintenance of the separation (by a retention device), also takes on reliable guiding of the tube (for example by one or more guide rollers). The advantage is now that only the weight of the damping tube (3) acts on the device (13) (14) and consequently holds this for longer.

The magnetic damper according to the invention can be used in various sizes in accordance with its planned use, the requisite damping characteristics and the available installation space. For wind turbines, it is appropriate to employ a magnetic damper, for example, for a pendulum absorber having a diameter of about 50 to 200 mm. Deviations upwards or downwards by up to 200% are likewise possible. As already, mentioned, the separation or air gap between a magnetic ring (4), or a ring-shaped magnetic arrangement, irrespective of whether it is constructed from permanent magnets or electromagnets (electromagnetic coils), and the outside surface and/or inside surface of the damper tube (3), is approximately between 0.1 mm and 2.0 mm, preferably 025-1.25 mm, in particular 0.5-1.0 mm. A greater separation or air gap is in principle possible and can also be produced more simply, but the total damping is reduced in this case. According to experience, the damping loss is about 17.5% (17-18%) per mm of gap.

The damping tube (3) of the damper according to the invention consists, as already stated, of a conductive material, preferably metal, for example of aluminium or copper or alloys of these metals. It has been found that a tube wall thickness between 8 to 10 mm effects the highest efficiency in the sense of damping.

For other areas of application apart from vibration absorbers, in particular for wind turbines, smaller and larger diameters, magnet sizes and tube thicknesses may be optimal.

Depending on the nature, the magnetic damper according to the invention enables damping densities of preferably between 1500 and 3000 kNs/m×m$^3$ to be achieved. This enables magnet material and installation space to be saved.

It is also possible to employ the magnetic dampers according to the invention as radial, passive magnetic bearing: in the case of relatively high speeds, the eddy currents in the tube (3) shift in the axial direction. Displacement of the eddy currents relative to the ring-shaped magnet arrangements (1) causes radial forces to form between the tube (3) and the magnet arrangements (1). These radial forces act like a radial bearing which wants to centre the magnet rings. This effect can be utilised in order to achieve non-contact bearing between magnet ring (1) and tube (3). The magnet arrangement in accordance with FIG. 8 (Halbach arrangement) is the most suitable here. In prototypes of magnetic levitation trains, this effect is already being utilised in order to generate the levitation using only permanent magnets (Inductrack). There, the magnets are in a flat arrangement and generate vertical lift from a certain speed. Horizontally, the flat arrangement is unstable, and a further arrangement of magnets is required in order also to stabilise this direction. Here, the ring magnets (1) of the damper are advantageous, since these are stable and centring in each radial direction. A radial magnetic bearing of this type is also suitable for relieving the load on sliding bearings. Radially acting forces between tube (3) and magnet rings (1) would be absorbed by conventional sliding bearings at rest and at low speeds. At higher speeds, which cause the greatest wear, sliding bearings of this type are completely relieved of load by the magnetic bearing. For example, two radial magnetic bearings with Halbach arrangement can be combined with the magnet rings (1). This enables the magnetic bearings to be optimised for low speeds, while the magnet rings (1) in between provide the actual axial damping.

An advantage of the use of magnetic dampers, in particular of permanent magnets, in vibration and bearing technology consists in that they always work. In general, no control or energy supply is required. The influence of temperature on the damping properties is minimal, and no additional temperature compensation is required.

In contrast to magnetic dampers known to date, the induced eddy currents in the case of the magnetic dampers according to the invention run around the tube (3). The eddy current is consequently more uniform, and the efficiency of the damper is higher. The eddy currents are circular and form a magnetic field which is similar to the magnet ring (1). By contrast, the eddy currents in the magnetic damper described in EP 2 696 072 form around the front and rear edges of the individual magnets described therein, with the consequence that the circuit board has to be made wider since the eddy currents generated are wider than the magnets.

Furthermore, the rotationally symmetrical geometry of the damper according to the invention is simpler to manufacture and enables use everywhere where normal rotationally symmetrical dampers, such as, for example, fluid dampers, have been used to date. Depending on the size, radially magnetised magnet rings (1) can often only be produced industrially with great effort, or not at all. It is advantageous here to produce the the magnet arrangements from individual flat, for example bar- or cube-shaped magnets, enabling greater diameters to be achieved.

The damper has, in particular, advantages in areas of use with great temperature differences and applications with constant damping coefficients, such as, for example, in tower absorbers or rotor blade absorbers in wind turbines. The magnetic dampers according to the invention or the vibration absorbers containing them are suitable and intended for the damping of vibrations of all types, in particular between 5 Hz and 200 or in the structure-borne range in machines and installations, in particular wind turbines.

Thus, the invention finally also relates to a wind turbine which is fitted with magnetic dampers and vibration absorbers described above and in the claims.

However, the magnetic damper according to the invention can also be employed as damping element in high-frequency absorbers in other installations. Due to the non-contact and friction-free damping, the magnetic damper has a very long service life and has no wear phenomena. In the motor vehicle sector and rail sector, the dampers are suitable for damping ail types of impacts and vibrations, since great temperature differences may also exist here. Combination of the magnetic damper according to the invention with, for example, a steel spring enables damping materials, such as, for example, elastomers, to be omitted. The magnetic damper according to the invention can also be employed in all cases where it is necessary to avoid contamination (for example in the food industry), since it works in a non-contact manner and without damping medium The magnetic dampers according to the invention can, as already mentioned above, be provided in various ways, depending on the type of damping required:

| Type of damping | Functional element | Description |
| --- | --- | --- |
| Passive | Permanent magnets | Magnets brake the relative movement depending on the speed |
| Semi-active | Coils with direct current | The magnetic fields can be adjusted by means of the current strength and enable variable damping |
| Active | Coils with alternating current | By means of a suitable alternating voltage, the damper can actively generate movement of the absorber and control the damping |

Passive:
The outer magnet rings (1) can, depending on the desired damping, be stacked and additionally also combined with inner magnet rings (5), Semi-Active:
A ring segment can be manufactured with two coils. The coils (6) can be stacked as desired and combined with inner coils (4B) in order to achieve the desired damping.

Active:

The coils supplied with alternating current can likewise be stacked in order to achieve more eddy currents and thus greater drive performance. Inner coils also increase the forces and performance here.

Combinations:

Passive, semi-active and active damping can be combined with one another at any time. It is also possible to combine all types in one damper in order to facilitate suitable damping for a very wide variety of types of operation of the absorber.

The magnetic dampers according to the invention can also be provided in the form of a kit or modular system. This is because it is appropriate to develop a modular system having a uniform diameter. The magnet rings (1) with the rings (2) can be assembled as a unit. The ring (2) here has a suitable shoulder on both sides in order that the rings can be stacked and simultaneously centred. The same shoulder is also used for the coils with direct and alternating current. It is consequently readily possible to stack the various types and combine them with one another. In addition, this simplifies exchangability, and subsequent expansion with, for example, active damping does not present a problem. This modular system also enables radial passive magnetic bearings to be installed in front of and behind the damping elements.

Furthermore, the outer rings (1) can also be tensioned against one another by means of end plates and external bolts. The inner rings (4) can be tensioned against one another by means of a central bolt. FIG. 10 shows an example with five outer and five inner magnet rings.

It is in principle conceivable to omit a ring-shaped arrangement in the case of the magnetic dampers according to the invention and instead to use rectangular tubes, for example square tubes. The magnets are then easier to produce, but the eddy currents are more difficult to calculate and losses may occur in the corners of the square tube since the magnetic fields are not superimposed on one another in an ideal manner. A polygon having eight or more sides comes ever closer to a circle and the magnetic damper becomes more efficient compared with a square tube. However, it becomes ever more uneconomical with increasing number of sides compared with the rotationally symmetrical solution. A further disadvantage of polygons is that it is vital to prevent twisting of the axis since otherwise the magnets collide with the tube. This is not a problem in the case of the rotationally symmetrical solution, where the damper can be twisted axially without collisions.

DETAILS OF THE INVENTION

Figure 1:
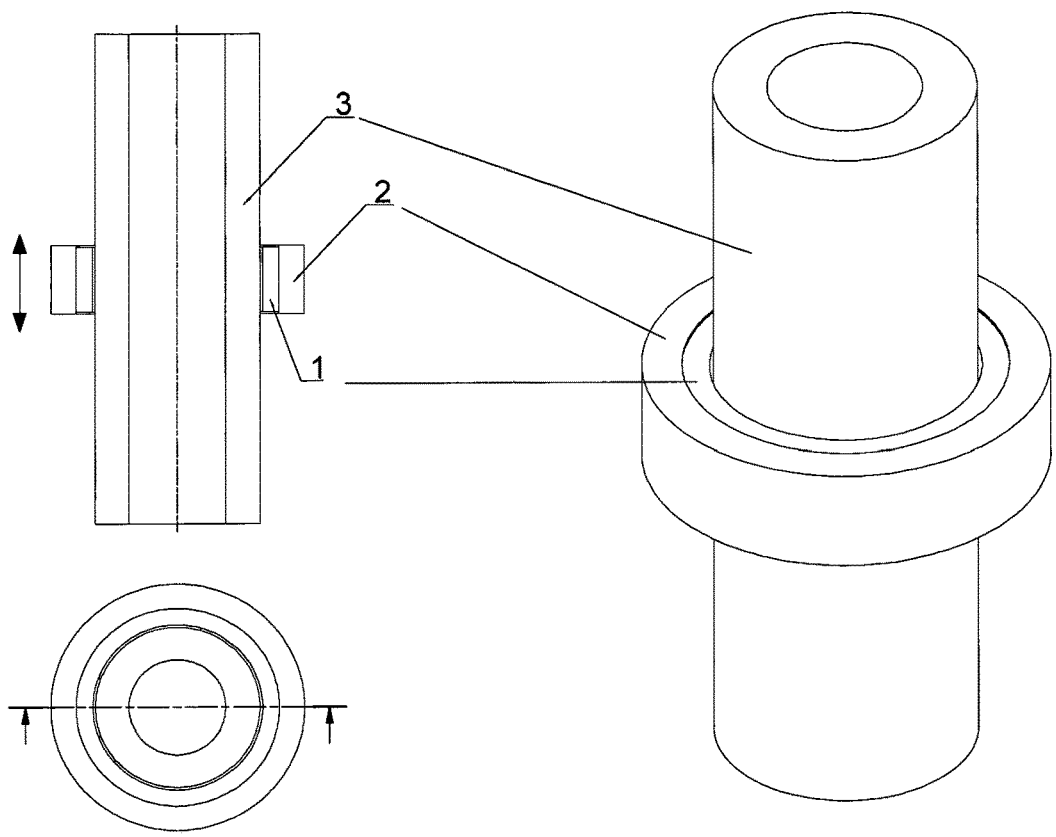
FIG. 1(A) depicts schematically a magnetic damper (A) according to the invention.
Figure 1:
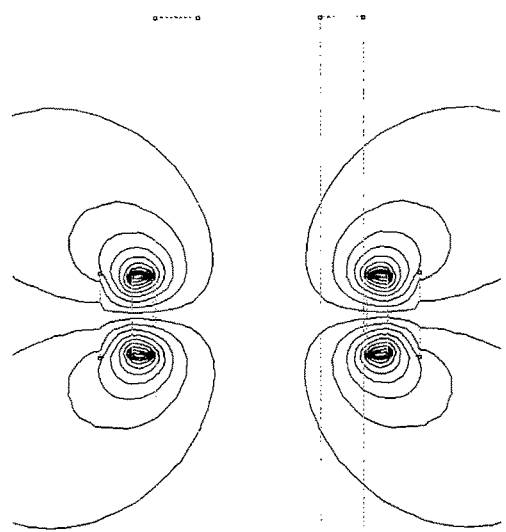

The reference numbers used in the text and figures are described in greater detail below:
- 1 outer radially magnetised magnet ring comprising permanent magnets
- 2 ferromagnetic outer ring
- 3 damping tube (or damping bar)
- 4 inner radially magnetised magnet ring comprising permanent magnets
- 5 ferromagnetic core or sleeve for inner magnet rings
- 6 outer electromagnetic coil ring (coil)
- 7 pendulum absorber with pendulum cable/rod and pendulum weight
- 8 ball joint absorber-damper
- 9 ball joint wall-damper
- 10 support device for damper according to the invention, in particular the magnet devices 1, 4, 5, 6, 11, 12
- 11 outer axially magnetised magnet ring comprising permanent magnets
- 12 inner axially magnetised magnet ring comprising permanent magnets
- 13 guide/spacer device, optionally incl. housing
- 14 roller device with holder and guide roller(s)
- 15 inner ferromagnetic tube or bar for damper tube (3)
- 16 inner electromagnetic coil ring or coil The invention is described in greater detail below with reference to the figures:

FIG. 1(A) depicts schematically a magnetic damper (A) according to the invention including the magnetic field of the closed magnet ring (B). The magnetic damper comprises the damping tube (3), which is made from a conductive, but non-ferromagnetic material/metal, preferably aluminium or copper or corresponding suitable alloys. The tube is surrounded, while maintaining a small separation in a contact-free and thus friction-free manner, by a magnet ring (1), the latter in turn surrounded directly and with contact or firm connection by a ring made from a ferromagnetic material, for example iron, iron alloy or steel having a high iron content. The magnetic effect of the magnet ring is thus enhanced. Relative movement of the damping tube (3) with respect to the magnet ring (1)-ring (2) component construct causes an eddy current to form, which generates a correspondingly directed magnetic field, causing the relative movement to be braked. If a lower magnetic density is desired, the enhancement ring (2) can be omitted.

The magnet ring (1) is ideally a closed ring magnet with radial magnetisation. The north pole is located, for example, on the inside surface and the south pole on the outside surface. The magnetisation direction may also be exactly the other way round. Suitable as magnet material are, for example, permanent magnets made from NdFeB, but it is also possible to use other magnets. Such as, for example, magnets made from SmCo, which are not quite as strong as NdFeB magnet, but their temperature resistance is higher and the temperature dependence is even lower.

Figure 2:
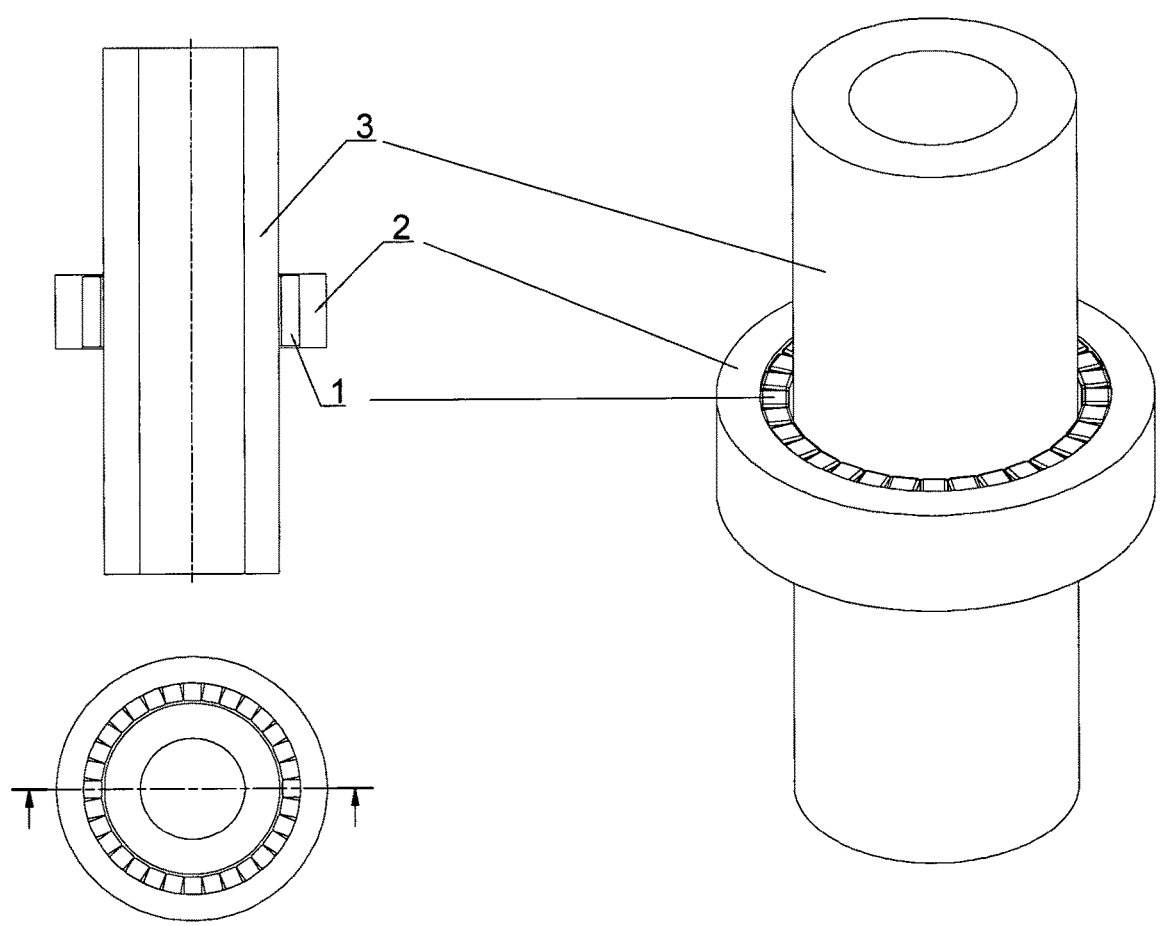
FIG. 2 depicts individual magnets, preferably bar or cube magnets, which are aligned radially in relation to the damping tube (3) with the north or south pole facing inwards.

Since closed ring magnets having radial magnetisation are difficult to manufacture industrially and are very expensive, the magnet ring (1) may also be constructed from individual magnets (1A), as depicted in FIG. 2. These individual magnets are preferably bar or cube magnets which are aligned radially in relation to the damping tube (3) with the north or south pole facing inwards (FIG. 2). It is also possible to manufacture flat magnet circle segments (for example 90° segments) and to assemble them to form a ring. In the case where individual magnets (1A) form the magnet ring (1), it is additionally possible to displace every second bar magnet in such a way that a chessboard pattern of north and south poles is formed. This enables the degree of damping to be influenced.

The damping tube (3) consists of a material having a very good electrical conductivity, preferably metal, in particular aluminium or copper or alloys of these metals. The thicker the material of the damping tube, the lower the electrical resistance and the higher the induced eddy currents.

The enhancement ring (2) consists of standard steel having the highest possible iron content and the lowest possible carbon content. The high iron content is important in order that the material exhibits "soft magnetism". This means that the material is easy to magnetise. Alternatively, it is also possible to use all other materials which have "soft magnetism". The magnet ring (1) can be adhesively bonded, for example, into the ring (2); however, the two rings can also be clamped against one another or firmly connected to one another in another manner. The steel ring (2) enhances the magnetic field in the interior and at the same time screens the magnetic field from the outside. The magnetic damper according to the invention also works without a steel ring, but the damping is consequently reduced.

The air gap between magnet ring and the damping tube should be small in order that the damping is as high as possible. A larger air gap/separation makes the magnetic field in the tube 3 weaker, and smaller eddy currents form. In accordance with the invention, a separation between about 0.1 mm and 2.0 mm has proven particularly effective.

It is also possible to vary the air gap or separation intentionally in order thus to modify the damping in a controllable manner. Thus, for example, the separation between magnet ring and the damping tube can be varied depending on the position of the magnet ring in relation to the damping tube (3). This is useful, in particular, on use of a plurality of magnet ring arrangements (1). This enables, for example, progressive/degressive damping characteristic lines to be achieved.

A further possibility for adjusting the damping is adjustment of the wall thickness of the tube (3) over the length. Thus, for example, the inside diameter can be varied with a constant outside diameter and the damping can thus be modified over the length of the tube (3) depending on the inside diameter.

Figure 3:
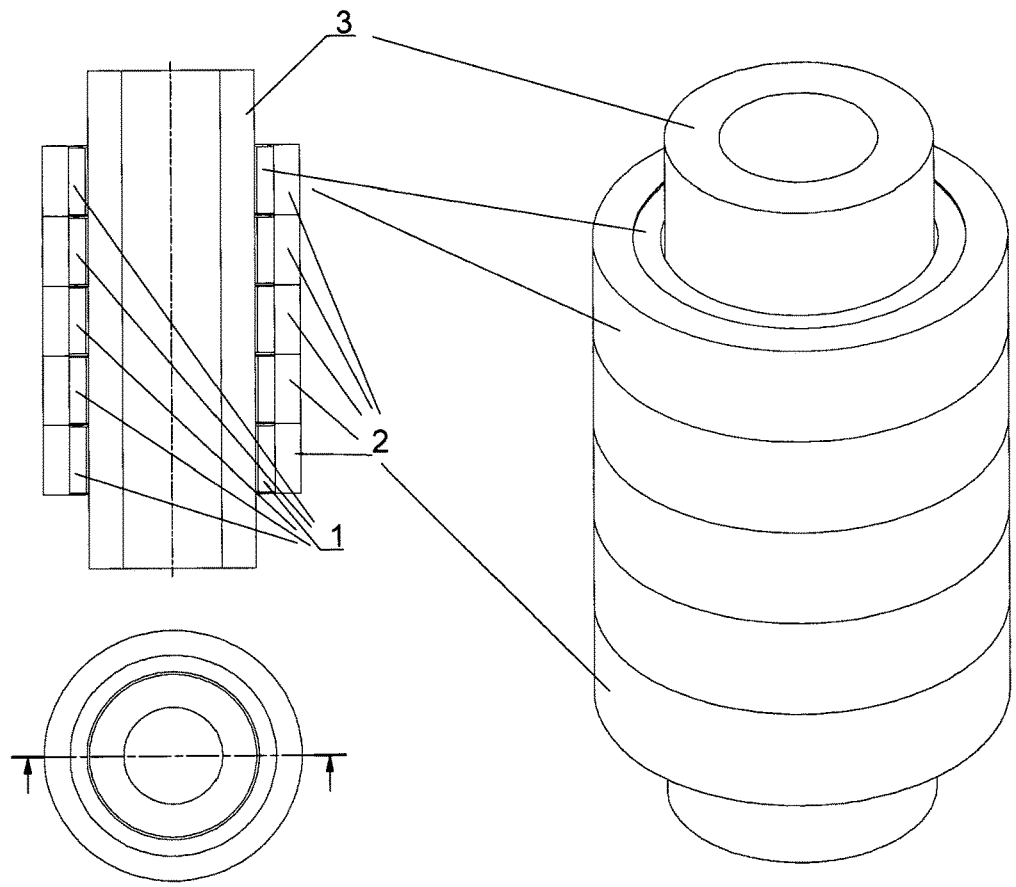
FIG. 3(A) shows a magnetic damper according to the invention.
FIG. 3(B) depicts the magnetic field of the five magnet rings of the magnetic damper according to the invention from FIG. 3(A).
FIG. 3(C) shows the eddy currents induced in tube (3) in the case of relative movement.
Figure 3:
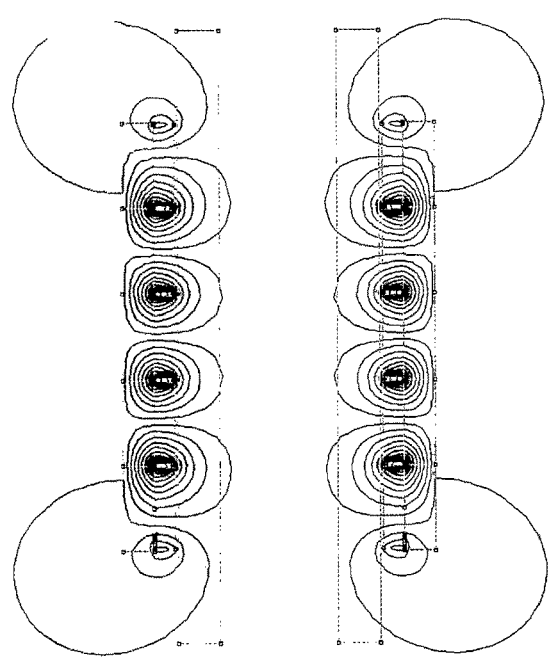
Figure 3:
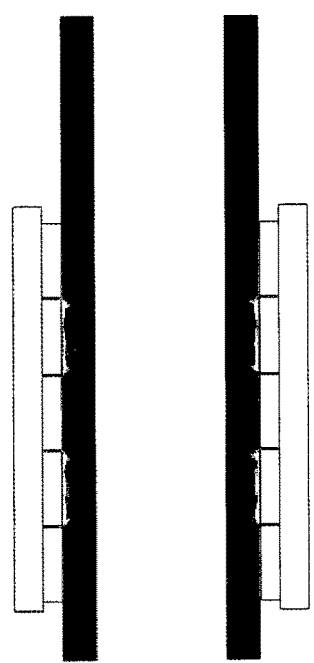

FIG. 3(A) shows a magnetic damper according to the invention which, in contrast to the embodiments of FIGS. 1 and 2, has a plurality of outer magnet rings (1)(1A) with corresponding enhancement rings (2). The rings here are closely stacked and have alternating polarity from one magnet ring (1) to the adjacent magnet ring (1). In order to increase the damping, a plurality of magnet rings 1 can be stacked (FIG. 3). The magnetic pole is alternated from ring to ring, so that either the north pole or the south pole is located on the inside. The magnetic fields thus reinforce one another and the efficiency of the damper increases. Two magnet rings (1) are thus more than twice as strong as a single magnet ring (1) (about 3.5×). This enhancement reduces the number of magnet rings 1 required to a minimum. With increasing number of magnet rings, the total damping can be increased in steps, in turn enabling the damping of the vibration system to be controlled. FIG. 3(B) depicts the magnetic field of the five magnet rings of the magnetic damper according to the invention from FIG. 3(A), and FIG. 3(C) shows the eddy currents induced in tube (3) in the case of relative movement.

Figure 4:
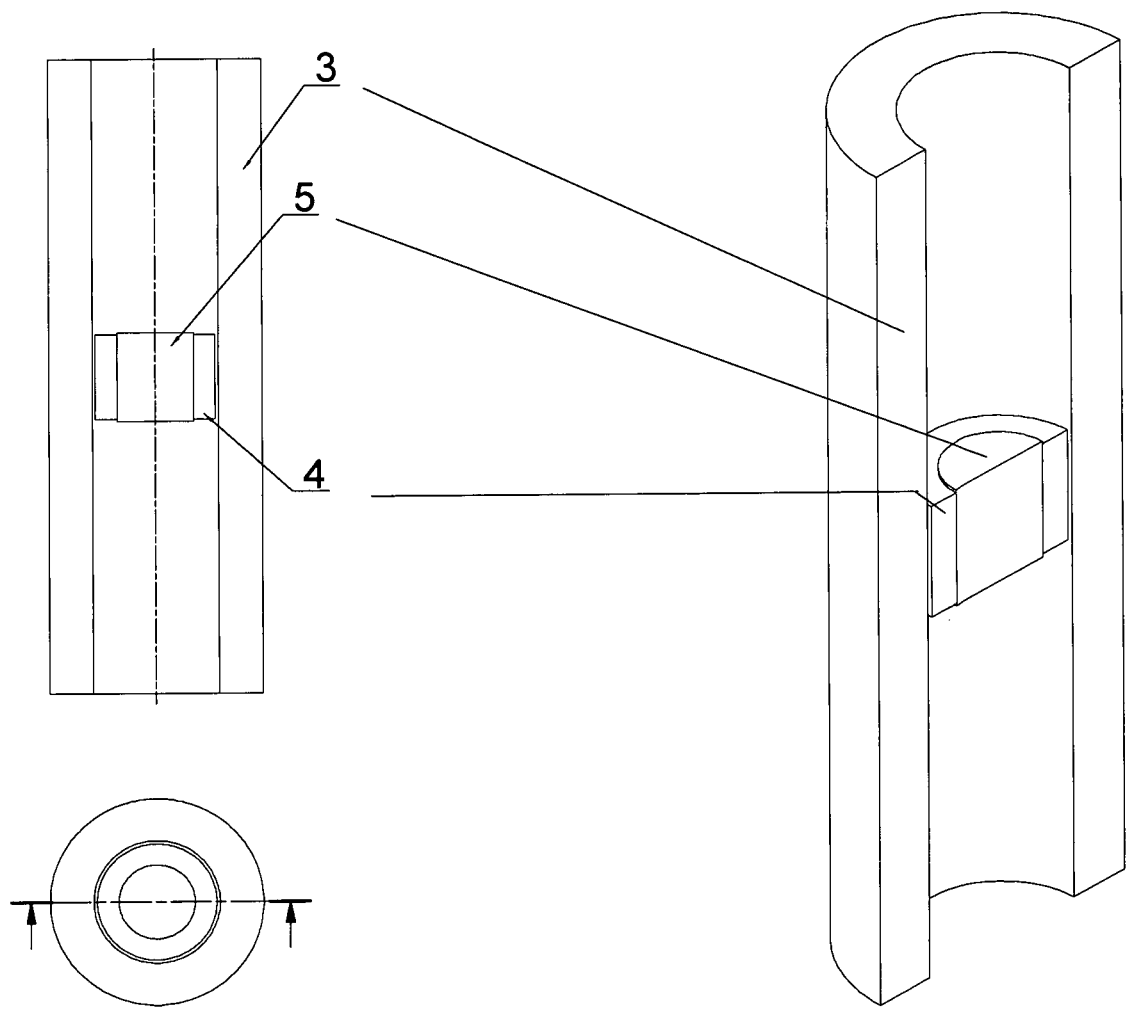
FIG. 4 depicts a further embodiment of the magnetic damper according to the invention.

FIG. 4 depicts a further embodiment of the magnetic damper according to the invention. Instead of the outer magnet ring (1), only an inner magnet ring (4)(4A) is used here, which is positioned in the interior of the damping tube (3) and has the corresponding non-contact separation from the inside surface of the tube (3). The outer enhancement ring (2) is replaced by a bar or core, or a sleeve (5) made from ferromagnetic material, preferably from steel, which has been pushed through the inner magnet ring (4) and is moved together with the latter. The inner magnet ring (4)(4A) is firmly connected, for example adhesively bonded, to (5) here. This construction is suitable for replacing fluid dampers known from the prior art.

Figure 5:
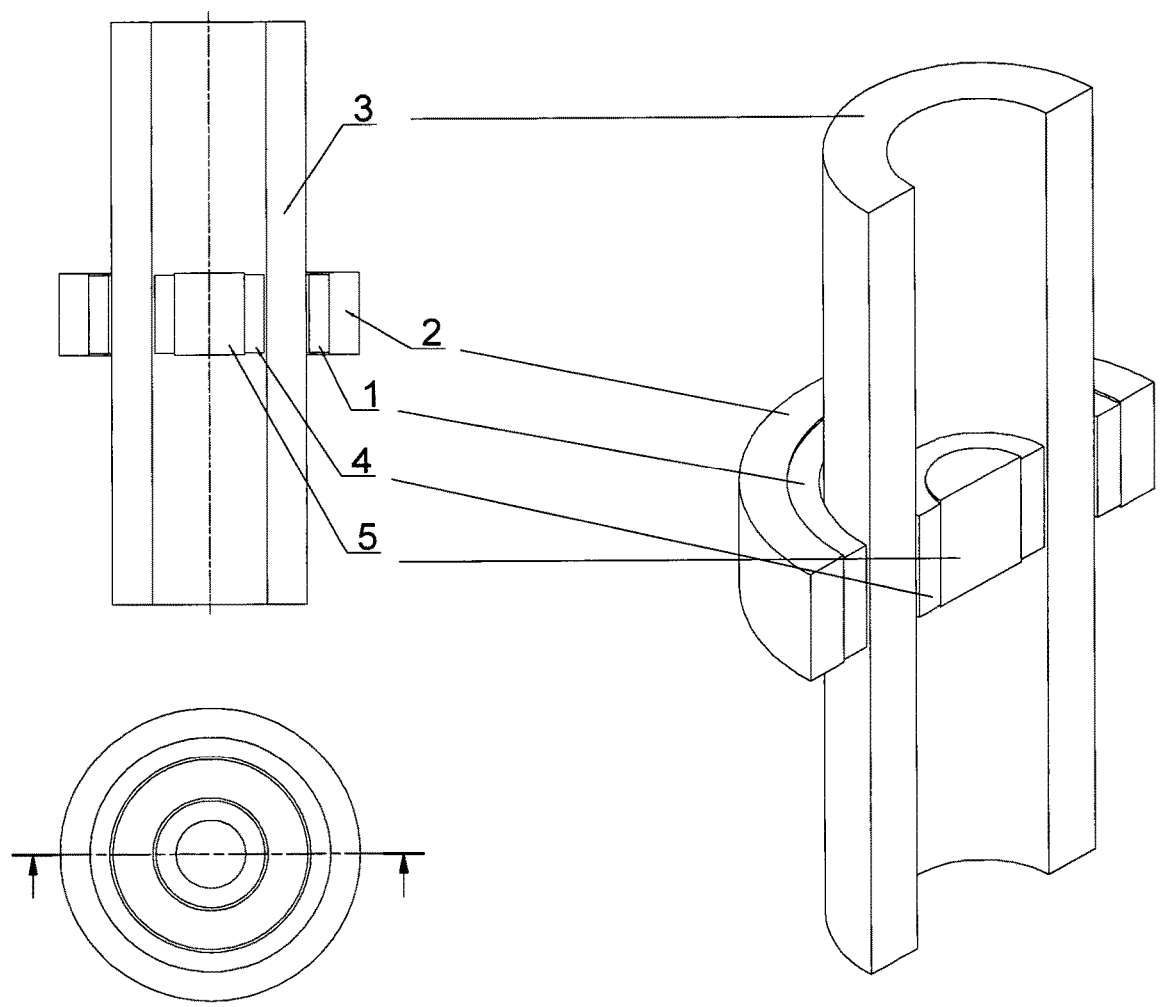
FIG. 5 depicts the variant with both elements (2) and (5).

In order to increase the efficiency of the damping still further, it is possible to use an inner magnet ring (4)(4A) and an outer magnet ring (1)(1A) in combination, as depicted in FIG. 5 for a pair of magnet rings. The two magnet rings (1)(1A) and (4)(4A), which are located opposite one another and are separated by the damping tube (3), are poled in such a way that they attract one another. The magnetic field in the tube (3) is thus approximately constant over the entire wall thickness. Analogously to FIG. 3(A), the inner magnet ring (4)(4A) and the outer magnet ring (1) can be stacked with alternating polarity in order to increase the damping. It is also possible here to omit the outer ring (2) and/or the inner core (5) if lower magnetic damping should be necessary. FIG. 5 depicts the variant with both elements (2) and (5).

Figure 6:
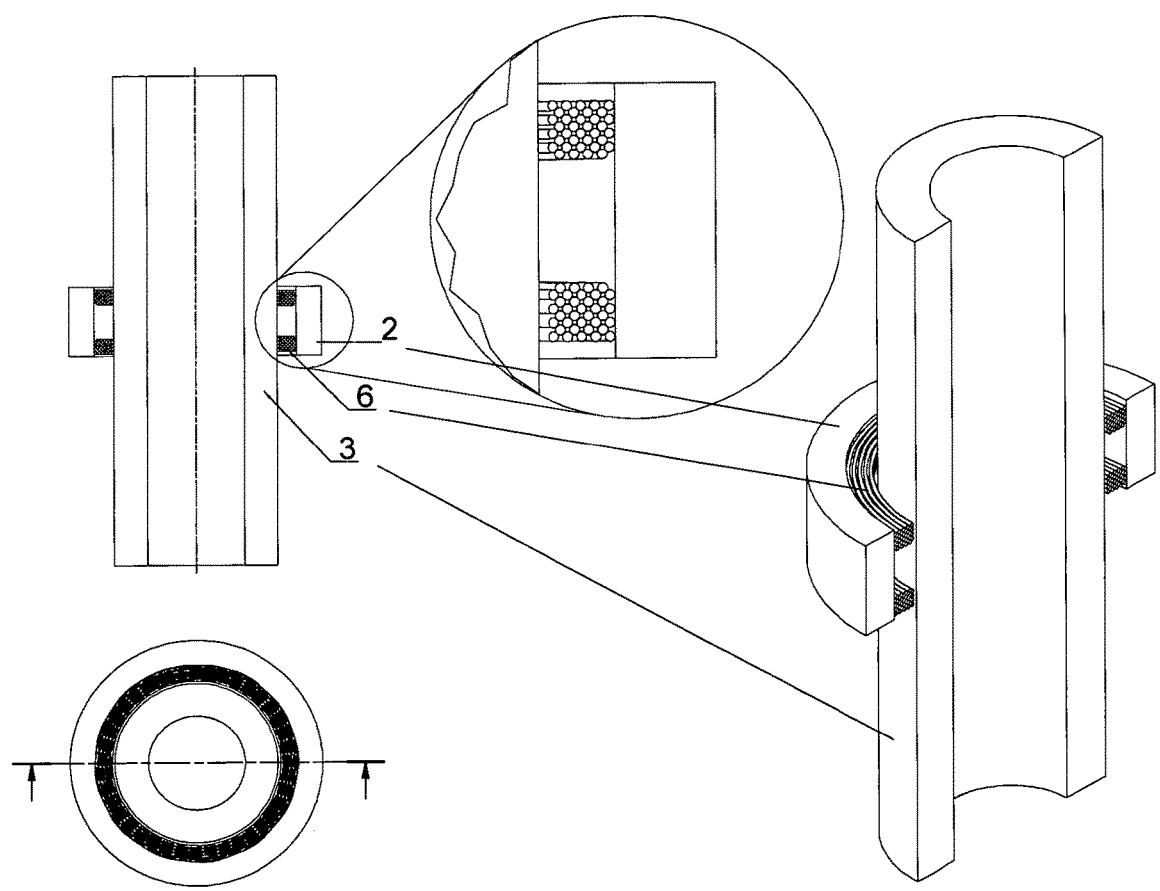
FIG. 6(A) shows a further embodiment of the magnetic damper according to the invention with an outer magnet ring (1) and a ferromagnetic ring (2).
FIG. 6B shows the magnetic field of the coils through which current is flowing.
Figure 6:
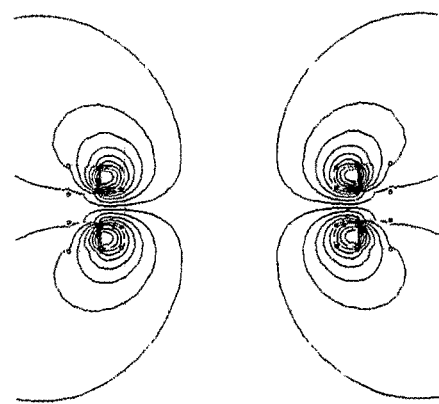

FIG. 6 (A) shows a further embodiment of the magnetic damper according to the invention with an outer magnet ring (1) and a ferromagnetic ring (2). However, the permanent magnets have been replaced here by electromagnets in the form of two wound coil rings (6), which generate a magnetic field when current flows through them. Each coil ring (6) may be constructed from one winding, or alternatively consist of a plurality of electromagnetic coils (1B), preferably connected to one another. A magnetic field forms around a conductor through which current is flowing. This magnetic field can be enhanced by the windings of the coil. The current direction is opposite in the two coil rings (6), and the magnetic field is similar to that of the magnet ring (1) (FIG. 6(B), see also FIG. 1(B)). The magnetic fields of the coil rings (6) can again be increased here by enhancement rings (2). This enables the damping to be switched on and off simply using the current. In addition, the damping can be varied via the change in the current strength. As in the case of the magnet rings (1) (4) (1A) (4A), it is also possible, in a further variant not shown here, to stack the coil rings (6) and also to use inner (4B) and outer (1B) coil rings in combination. FIG. 6B shows the magnetic field of the coils through which current is flowing.

In another variant of this embodiment, not shown, permanent magnets (1A)(4A) can be combined with electromagnets (1B)(4B), giving rise to the following possibilities: (i) The permanent magnets provide basic damping. The electromagnets which can be switched on are able to increase the damping further for situations in which higher damping is necessary; and (ii) the permanent magnets provide basic damping. The electromagnets which can be switched on can "switch off" the permanent magnets in that their magnetic field points in the opposite direction to the magnetic field of the permanent magnets. The damper can thus be switched off when necessary.

Figure 7:
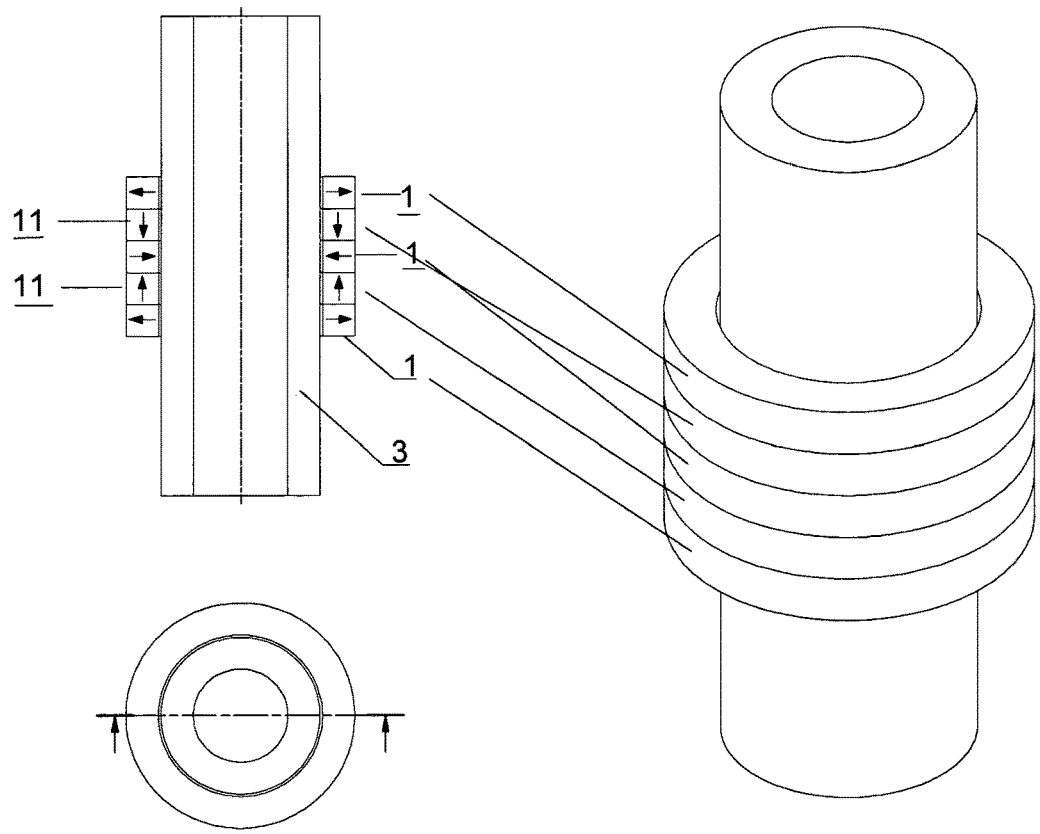
FIG. 7(A) depicts a variant of a further embodiment of the magnetic damper according to the invention.
FIG. 7(B) depicts corresponding magnetic fields.
Figure 7:
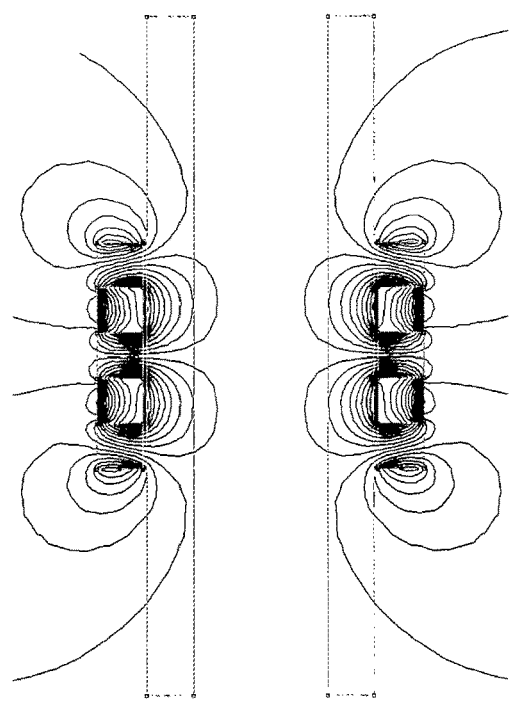
Figure 8:
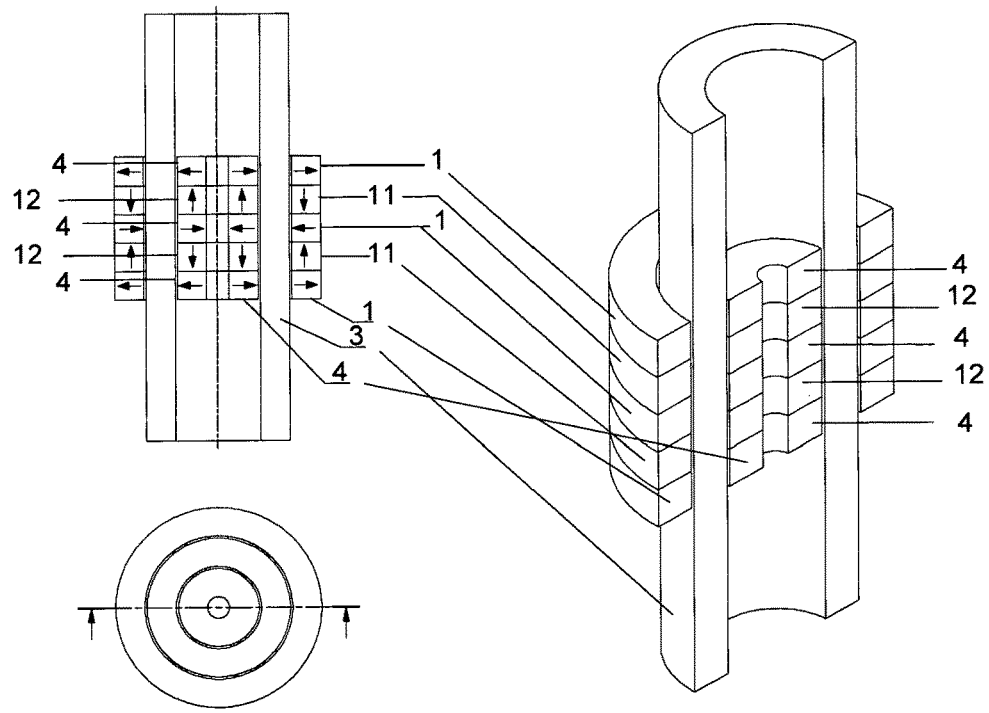
FIG. 8(A) depicts two variants of a further embodiment of the magnetic damper according to the invention.
FIG. 8(B) depicts corresponding magnetic fields.
Figure 8:
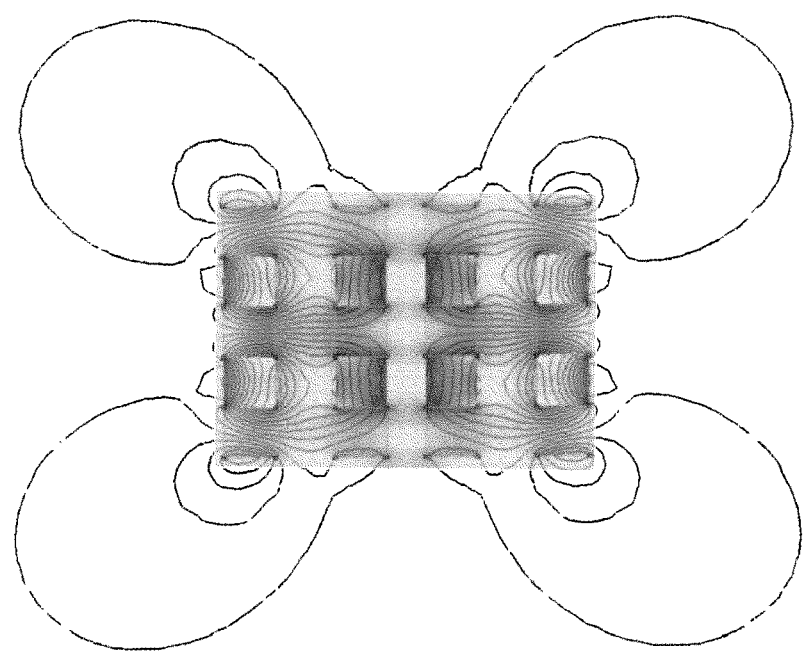

FIG. 7 and FIG. 8 depict two variants (FIG. 7(A), FIG. 8(A)) of a further embodiment of the magnetic damper according to the invention, in which use is made of magnetic fields not only aligned radially (in relation to the damping tube (3)) (by means of permanent magnets and/or electromagnets), but also magnetic fields (11)(12) aligned axially (in relation to the damping tube (3)), which is also known as the Halbach arrangement. FIG. 7 here corresponds to the embodiment of FIG. 3, apart from the said Halbach arrangement of the magnets, i.e. has outer magnets (1)(11). FIG. 8 additionally to FIG. 7 also has inner magnets in Halbach arrangement (4)(12). The corresponding magnetic fields are likewise depicted (FIG. 7(B), FIG. 8(B)).

In both variants, the stacked magnet rings can also be magnetised in such a way that the magnetic field is enhanced on one side, while it virtually disappears on the other side. The arrows in the magnet rings point in the direction of the respective north pole. The magnet rings are magnetised alternately axially and radially.

The advantage of this arrangement is that a stronger magnetic field is generated where it is used and a weaker magnetic field is generated where it is not used. Screening by outer rings (2) is thus unnecessary. In addition, it is also possible to achieve a Halbach arrangement in the interior of the tube 3 and to combine this with an outer Halbach arrangement. Here too, the closed magnet rings can be replaced by individual magnets. All rings (axially and radially magnetised) can be assembled using cube or bar magnets.

Figure 9:
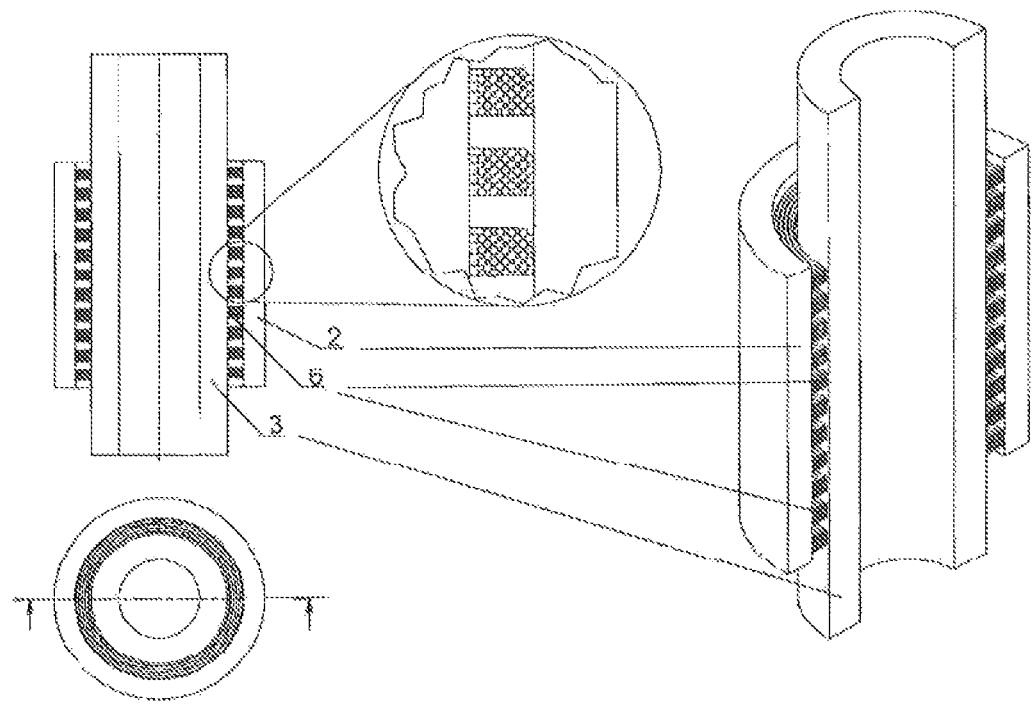
FIG. 9 shows a further arrangement of the magnetic damper according to the invention.

FIG. 9 shows a further arrangement of the magnetic damper according to the invention which is composed of a series of outer coil rings (6) or coil arrangements and with which active damping can be achieved. If an electric current flows through coil ring (6), a magnetic field forms around the latter. If the coil rings (6) are switched on and off differently in a certain manner, the magnetic fields migrate along the tube (3). One possibility is to apply a separate alternating current to each individual coil ring (6). The alternating current here has a certain phase angle from one coil to another. Consequently, each coil has its maximum current at a different point in time. A suitable frequency is, for example, 50 Hz or 60 Hz and the phase angle from coil to coil (6) is between 30° and 120°. The moved magnetic fields induce eddy currents, which likewise start to migrate. The eddy currents exert an axial force on the tube and accelerate it. Thus, a force can take place actively on the absorber in order, for example, to effect stronger braking or to enable the absorber to vibrate actively at another frequency. In order to increase the efficiency at different speeds, the frequency and phase angle can be adjusted using frequency converters. Combination with inner coil rings (16) (not shown) increases the forces by a multiple.

Figure 10:
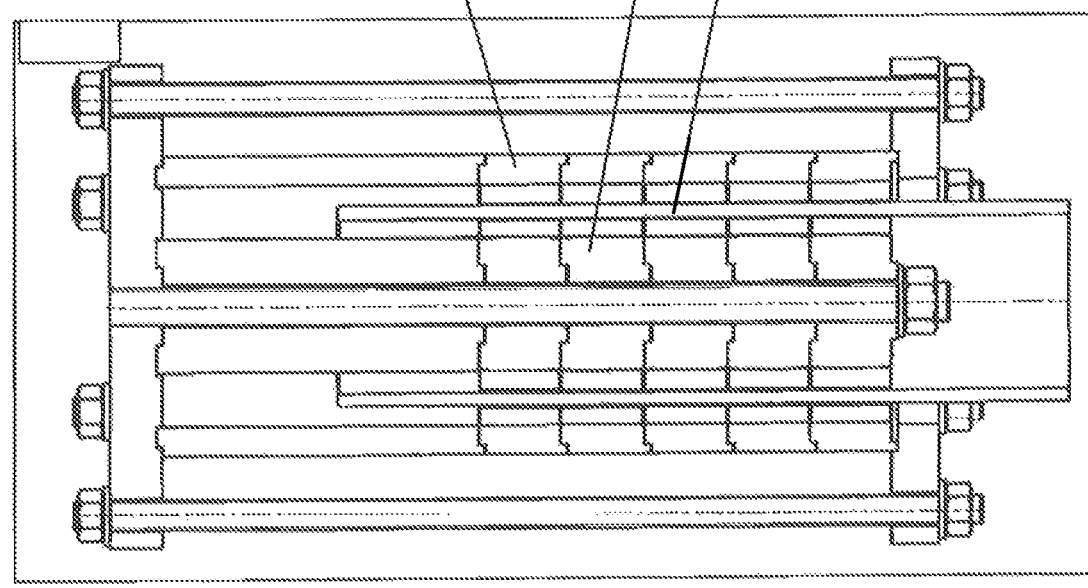
FIG. 10 shows an example with five outer and five inner magnet rings.

FIG. 10 shows a magnetic damper, damped in a support frame (10), having five inner and outer magnet rings and a damping tube (3), which is moved by the firmly clamped magnet devices.

Figure 11:
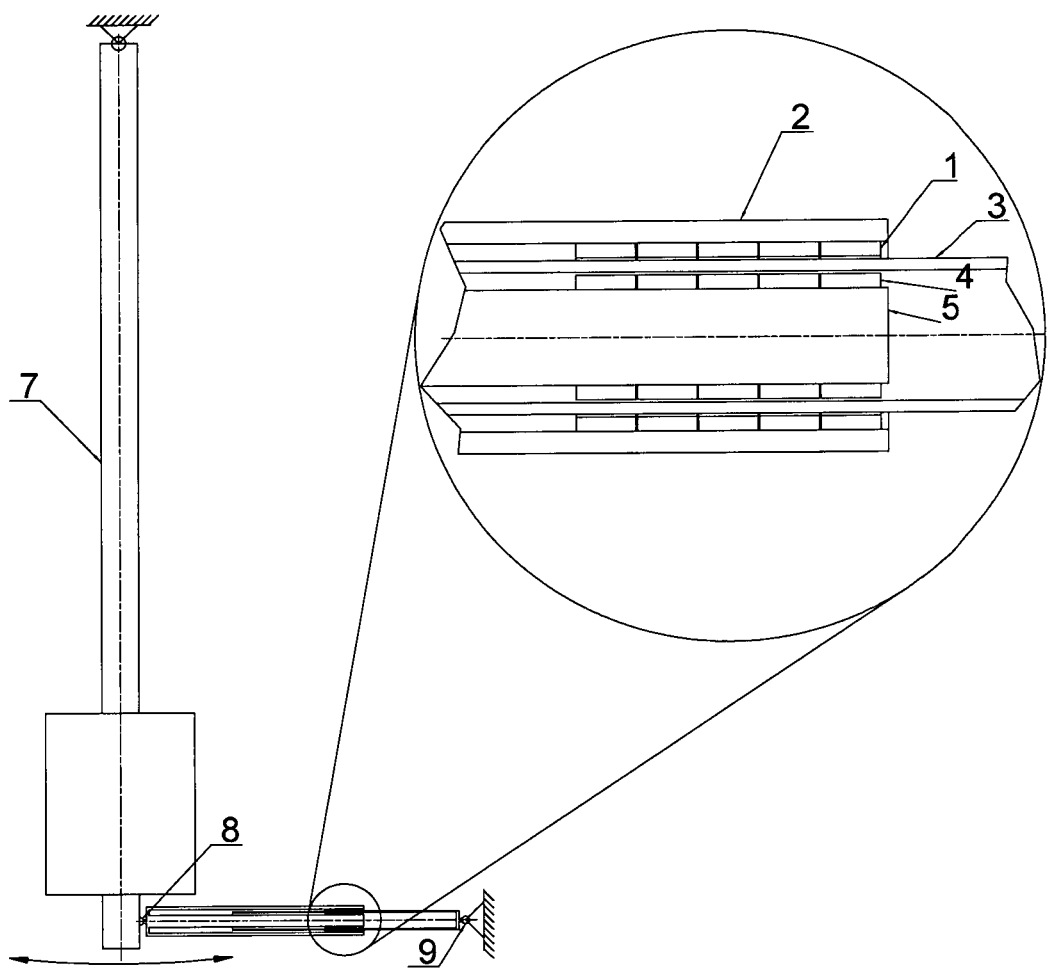
FIG. 11 shows a pendulum absorber (7), which is fitted with a magnetic damper according to the invention.

FIG. 11 shows a pendulum absorber (7), which is fitted with a magnetic damper according to the invention which has outer and inner magnet elements (1)(4) and a solid core (5). The absorber can be a simple pendulum or transversal pendulum with a pendulum weight on a pendulum rod or pendulum cable. The vibration movements of the absorber 7 generate small angles, which can be compensated by simple ball joints (8) and (9). The magnetic dampers can be installed in any position, the dampers work the most efficiently in the horizontal position. On the other hand, the requisite travel distance of the damper is also the greatest when it is installed horizontally.

Figure 12:
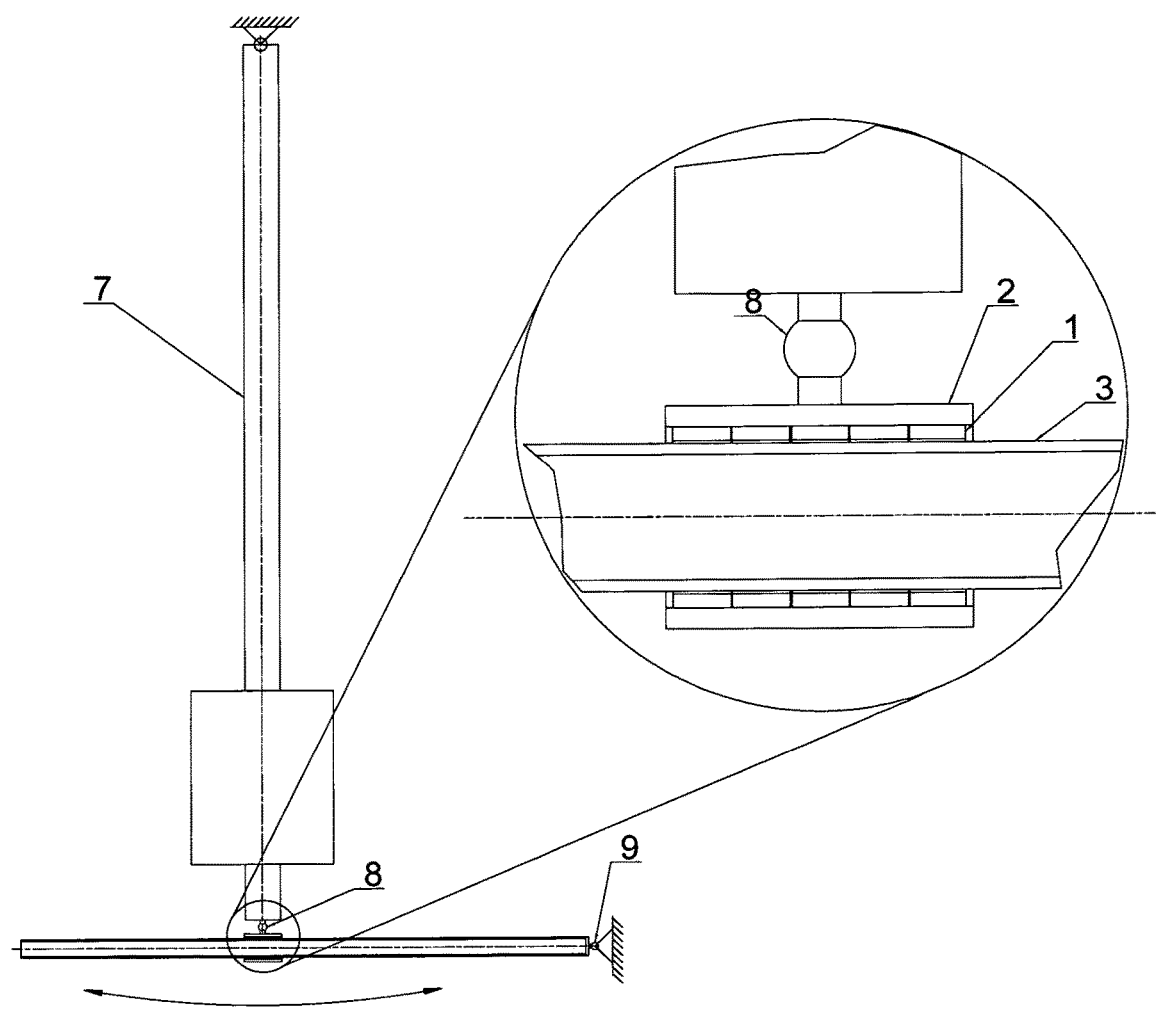
FIG. 12 depicts a pendulum absorber (7) which corresponds to that from FIG. 11.

FIG. 12 depicts a pendulum absorber (7) which corresponds to that from FIG. 11. In contrast to the latter, the installed magnetic damper in this embodiment has no inner magnet rings (4). This has the effect that the distance over the damper tube can effectively move is increased by more than double.

Figure 13:
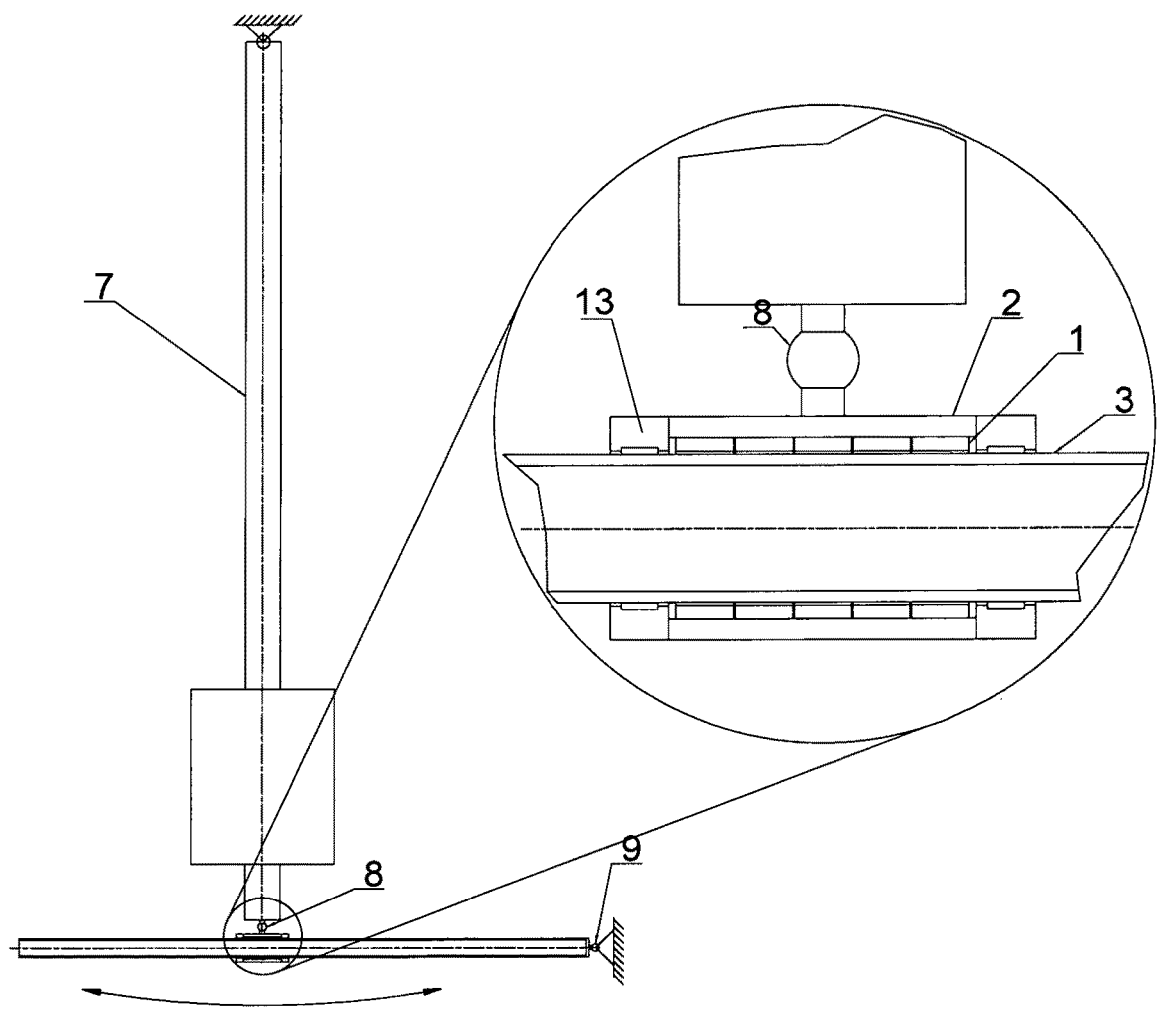
FIG. 13 essentially depicts the pendulum absorber from FIG. 12
Figure 14:
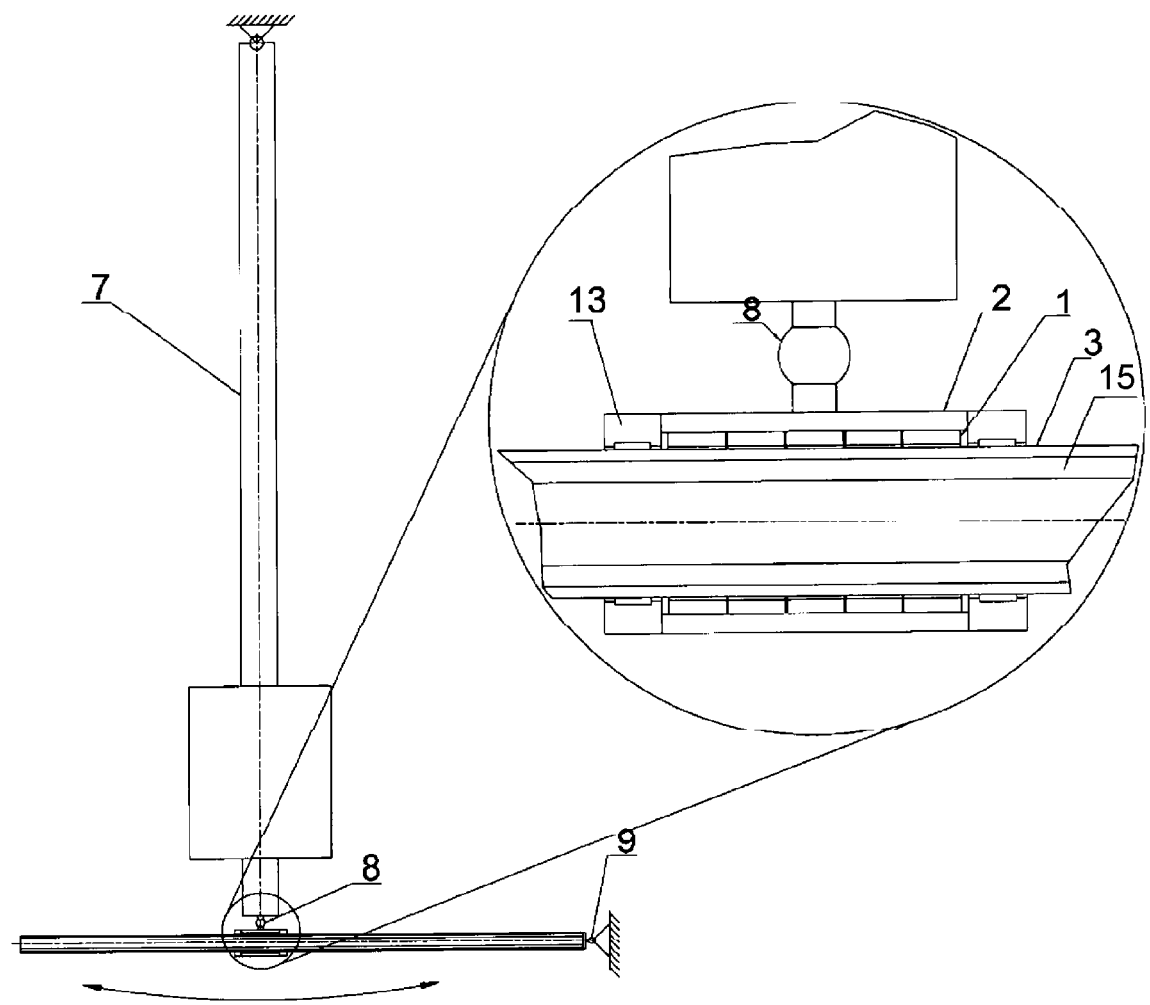
FIG. 14 essentially depicts the pendulum absorber from FIG. 12

FIG. 13 and FIG. 14 essentially depict the pendulum absorber from FIG. 12, but it additionally has a guide and/or spacer device or centring device (13) (14) at both ends of the tube region in which the damping is effective. This is intended to ensure that the damping tube (3) does not hit the magnet devices (1) (4) in the interior and/or the tube (3) on the outside, i.e. can move in a friction-free and thus non-contact manner in the region in question, and in addition is moved safely through this region. The device (13) (14) can be, for example, a sliding or roller bearing, for example a slide bushing or a ball bearing, but can also be a simple holder which is connected to a fixed part of the installation.

Figure 15:
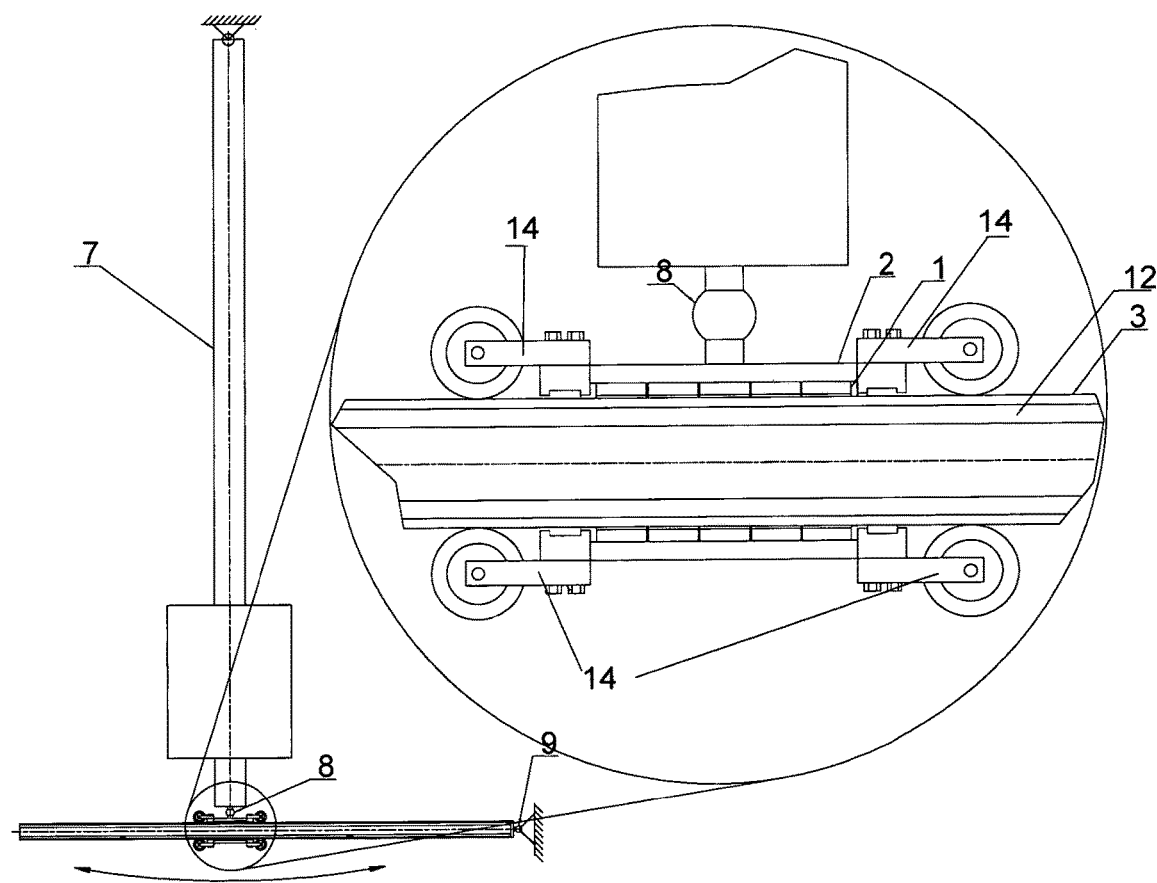
FIG. 15 shows a corresponding pendulum absorber according to FIG. 13 or 14.

FIG. 15 shows a corresponding pendulum absorber according to FIG. 13 or 14 which is equipped with a magnetic damper according to the invention which, as further variant of the centring device, comprises a roller device (14). The centring of the magnetic damper around the tube (3) is effected here in particular by a roller guide. This enables higher running speeds and travel distances to be achieved. The roller guide consists of one or more guide rollers, which are distributed around the tube. Each guide roller can be adjusted individually by means of the adjustable roller holder in order to achieve optimum centring and pretensioning. The roller device described can also be combined with guide or slide bushings positioned outside the damper.

In practice, a guide and spacer device comprising three guide rollers with corresponding holders which are distributed uniformly at an angle of 120° around the outside of the damping tube has proven particularly advantageous. Failure or strong wear of a guide roller can optionally be intercepted with the aid of an additional slide bushing before a collision occurs between tube (3) and magnet rings (1). An air gap is provided between the slide bushing and the tube (3), so that contact only occurs between tube and slide bushing when a guide roller fails. During the next maintenance interval, the guide roller can either be adjusted using the adjustable roller holder or replaced, and the load on the slide bushing is relieved again. For centring of the magnet rings in relation to the tube, only the guide rollers of the device are necessary.

For optimisation of the magnetic dampers according to the invention with respect to the damping effect, it is advantageous to understand the magnetic fields formed qualitatively and quantitatively. The rotational symmetry makes 3D simulations of the magnetic fields and eddy currents unnecessary. Only a 2D axis-symmetrical simulation has to be carried out in order to calculate the magnetic dampers completely, which simplifies and shortens the calculations. Corresponding programs for simulation and calculation of such fields are known from the prior art. The freely available program FEMM 4.2 can be used to calculate the magnetic fields of the individual variants (FIG. 1(B), FIG. 3(B), 3(C), FIG. 6(B), FIG. 7(B), FIG. 8(B)) These are magneto-static simulations in order to visualise the course and strength of the magnetic fields. Movement of the magnet rings (1) relative to the tube (3) cannot be calculated in this program.

The eddy currents and damper forces have been calculated using the ANSYS Maxwell 15.0 program. As soon as relative movement occurs between the tube (3) and the magnet rings, rotating electric currents are induced in the tube. These eddy currents form magnetic fields which act against the magnet rings (1). The force on the tube (3) can be output by the program and the damping constant can be calculated using the relative speed.

The invention claimed is:

1. A vibration absorber for damping vibrations in a wind turbine installation comprising
   (a) at least one pendulum cable or pendulum rod with a pendulum weight (7),
   (b) at least one magnetic damper which is rotationally symmetrical and comprises the following components:
      (i) a damper tube (3) made from a non-magnetizable conductive material,
      (ii) at least one outer, in relation to the damper tube (3), magnetic ring (1) of one or more permanent magnets which are arranged in such a way that north and south poles of the permanent magnets are aligned to point either radially inwards or radially outwards in relation to a longitudinal axis of the damper tube (3) of the magnetic damper, where the at least one outer magnetic ring (1) of the one or more permanent magnets has been pushed over the damper tube (3) facing an outside surface thereof, and the at least one outer magnetic ring of the one or more permanent magnets and the damper tube (3) are axially and rotationally movable relative to one another in a non-contact and friction-free manner, and a separation between the at least one outer magnetic ring (1) and the outside surface of the damper tube (3) is between 0.1 mm and 2.0 mm,
      (iii) a support frame (10) to clamp the at least one outer magnetic ring (1), which is attached to the pendulum weight or the pendulum rod, or to a wind turbine structure to be damped, and
      (iv) at least one ring (2) consisting of a ferromagnetic material or segments composed thereof, which immediately surrounds the at least one outer magnetic ring (1), and
   (c) at least one of a centering and spacer device (13)(14), which is mounted in at least one of in front of and behind a functional region of the magnetic damper and ensures friction-free relative movement of the damper tube (3) relative to the at least one outer magnet ring (1) of the one or more permanent magnets.

2. The vibration absorber according to claim 1, wherein the magnetic damper comprises between two and ten outer magnetic rings of permanent magnets (1) which are stacked one above the other, and radially directed polarity of the between two and ten outer magnetic rings of permanent magnets (1) alternates from radially magnetized ring plane to radially magnetized ring plane.

3. The vibration absorber according to claim 1, wherein, in addition to the damper tube (3), the magnetic damper has a tube (15) consisting of a ferromagnetic material or a corresponding round bar (15), which is in contact with an inside wall of the damper tube (3) and is firmly connected thereto such that only common movement with the damper tube (3) occurs.

4. The vibration absorber according to claim 1, wherein the magnetic damper:
   (i) has the at least one outer magnetic ring (1) of one or more permanent magnets, which are magnetized radially inwards or radially outwards in relation to the longitudinal axis of the magnetic damper, and
   (ii) additionally has at least one further outer magnetic ring (11) of one or more permanent magnets which are magnetized axially upwards or axially downwards in relation to the longitudinal axis of the magnetic damper, and the at least one further outer magnetic ring (11) is arranged on the outside of the damper tube (3) in a non-contact manner.

5. The vibration absorber according to claim 4, wherein the magnetic damper has at least a first and a second outer magnetic ring (11) which are axially magnetized and separated from one another by a radially magnetized outer ring (1), where a north/south magnetization direction of the magnets of the first axially magnetized outer magnetic ring (11) is opposite to a north/south magnetization direction of the second axially magnetized outer magnetic ring (11).

6. The vibration absorber according to claim 4, wherein the magnetic damper has at least a first and a second outer ring (1) which are radially magnetized and separated from one another by the further outer magnetic ring (11), where a north/south magnetization direction of the magnets of the first radially magnetized outer ring (1) is opposite to a north/south magnetization direction of the second radially outer magnetized ring (1).

7. The vibration absorber according to claim 1, wherein the damper tube (3) is attached directly to the wind turbine structure to be damped.

8. The vibration absorber according to claim 1, wherein the damper tube (3) is attached to the pendulum weight or the pendulum rod, and the support frame (10) of the magnetic damper is attached directly to the wind turbine structure to be damped.

9. A wind turbine containing at least one vibration absorber according to claim 1.

10. The vibration absorber of claim 1, comprising at least two of the rotationally symmetrical magnetic dampers, which are arranged in such a way that they cover a horizontal vibration plane.

* * * * *